(12) United States Patent
Lee et al.

(10) Patent No.: US 12,044,920 B2
(45) Date of Patent: *Jul. 23, 2024

(54) SEE-THROUGH TYPE DISPLAY APPARATUS

(71) Applicant: SAMSUNG ELECTRONICS CO., LTD., Suwon-si (KR)

(72) Inventors: Changkun Lee, Seoul (KR); Wontaek Seo, Yongin-si (KR); Geeyoung Sung, Daegu (KR); Bongsu Shin, Seoul (KR); Jungkwuen An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 209 days.

This patent is subject to a terminal disclaimer.

(21) Appl. No.: 17/563,649

(22) Filed: Dec. 28, 2021

(65) Prior Publication Data

US 2022/0121061 A1 Apr. 21, 2022

Related U.S. Application Data

(63) Continuation of application No. 16/269,149, filed on Feb. 6, 2019, now Pat. No. 11,243,427.

(30) Foreign Application Priority Data

Sep. 21, 2018 (KR) .................. 10-2018-0114147

(51) Int. Cl.
*G02F 1/1335* (2006.01)
*G02B 5/08* (2006.01)
(Continued)

(52) U.S. Cl.
CPC ......... *G02F 1/133528* (2013.01); *G02B 5/08* (2013.01); *G02B 5/3025* (2013.01);
(Continued)

(58) Field of Classification Search
CPC .. G02B 27/01; G02B 27/017; G02B 27/0172; G02B 27/0178
See application file for complete search history.

(56) References Cited

U.S. PATENT DOCUMENTS 5,886,822 A 3/1999 Spitzer
5,999,237 A * 12/1999 Miyawaki ........... G02F 1/13454
349/95
(Continued)

FOREIGN PATENT DOCUMENTS

CN 102445756 A 5/2012
CN 106664400 A 5/2017
(Continued)

OTHER PUBLICATIONS

Seungjae Lee et al., "Foveated Retinal Optimization for See-Through Near-Eye Multi-Layer Displays", IEEE Access, vol. 6, Feb. 14, 2018, pp. 2170-2180, 11 pages total.
(Continued)

*Primary Examiner* — Cara E Rakowski
(74) *Attorney, Agent, or Firm* — Sughrue Mion, PLLC

(57) ABSTRACT

A display apparatus includes: a display device configured to output a first image; an optical coupler configured to: combine the first image received through a first path from the display device with a second image received through a second path that is different from the first path, output, through an exit surface of the optical coupler, a first light corresponding to the first image in a first polarization and a second light corresponding to the second image in a second polarization; and a polarization selection optical system arranged on the exit surface of the optical coupler and configured to have different refractive power with respect to the first light of the first polarization and the second light of the second polarization.

18 Claims, 28 Drawing Sheets

(51) Int. Cl.
  *G02B 5/30* (2006.01)
  *G02B 27/00* (2006.01)
  *G02B 27/10* (2006.01)
  *G02B 27/28* (2006.01)
(52) U.S. Cl.
  CPC ......... *G02B 27/0025* (2013.01); *G02B 27/10* (2013.01); *G02B 27/283* (2013.01); *G02F 1/133526* (2013.01); *G02F 1/133553* (2013.01)

(56) References Cited

U.S. PATENT DOCUMENTS

| | | |
|---|---|---|
| 7,002,751 B2 | 2/2006 | Kobayashi et al. |
| 9,927,614 B2 | 3/2018 | Vallius |
| 10,197,807 B2 | 2/2019 | Yang |
| 10,197,810 B2 | 2/2019 | Seo et al. |
| 10,502,876 B2 | 12/2019 | Robbins et al. |
| 10,545,337 B2 | 1/2020 | Sung et al. |
| 11,487,121 B2 | 11/2022 | Tekolste et al. |
| 2014/0071539 A1 | 3/2014 | Gao |
| 2016/0189432 A1 | 6/2016 | Bar-Zeev et al. |
| 2017/0123204 A1 | 5/2017 | Sung et al. |
| 2017/0184848 A1 | 6/2017 | Vallius |
| 2017/0199442 A1 | 7/2017 | Kim et al. |
| 2017/0269366 A1 | 9/2017 | Lee et al. |
| 2017/0299860 A1 | 10/2017 | Wall et al. |
| 2018/0107000 A1 | 4/2018 | Sung et al. |
| 2018/0210222 A1 | 7/2018 | Seo et al. |
| 2019/0086672 A1* | 3/2019 | Kim ............... G02B 27/286 |
| 2019/0171005 A1 | 6/2019 | Lee et al. |
| 2019/0331922 A1 | 10/2019 | Kim et al. |
| 2020/0124778 A1* | 4/2020 | Lee ............... G02B 27/0101 |
| 2021/0048677 A1 | 2/2021 | Sung et al. |

FOREIGN PATENT DOCUMENTS

| | | |
|---|---|---|
| CN | 107966813 A | 4/2018 |
| CN | 108347597 A | 7/2018 |
| CN | 108474956 A | 8/2018 |
| EP | 3312659 A1 | 4/2018 |
| JP | 2013-114022 A | 6/2013 |
| KR | 10-2016-0029245 A | 3/2016 |
| KR | 10-2016-0071229 A | 6/2016 |
| KR | 10-2016-0147636 A | 12/2016 |
| KR | 10-2017-0049358 A | 5/2017 |
| KR | 10-2017-0083690 A | 7/2017 |
| KR | 10-1901985 B1 | 11/2018 |

OTHER PUBLICATIONS

Yi-Hsin Lin et al., "Liquid crystal lenses with tunable focal length", Liquid Crystals Reviews, vol. 5, No. 2, Mar. 1, 2018, pp. 111-143, 35 pages total.

Jiyoon Kim et al., "Liquid crystal-based square lens array with tunable focal length", Optics Express, vol. 22, No. 3, Feb. 2014, pp. 3316-3324, 9 pages total.

Jong-Young Hong et al., "See-through optical combiner for augmented reality head-mounted display: index-matched anisotropic crystal lens", Scientific Reports, 7: 2753, DOI: 10.1038, Jun. 5, 2017, pp. 1-11, 11 pages total.

Communication dated Jan. 21, 2020 issued by the European Intellectual Property Office in counterpart European Application No. 19165146.2.

Communication dated Oct. 16, 2019, issued by the European Patent Office in counterpart European Application No. 19165146.2.

Communication dated Mar. 14, 2023, issued by China National Intellectual Property Administration in Chinese Application No. 201910144983.9.

Communication dated May 22, 2023, issued by Korean Intellectual Property Office in Korean Application No. 10-2018-0114147.

Communication dated Sep. 1, 2022 issued by the China National Intellectual Property Administration in Chinese Patent Application No. 201910144983.9.

* cited by examiner

SEE-THROUGH TYPE DISPLAY APPARATUS

CROSS-REFERENCE TO RELATED APPLICATION

This application is a continuation of U.S. application Ser. No. 16/269,149, filed on Feb. 6, 2019 which claims priority from Korean Patent Application No. 10-2018-0114147, filed on Sep. 21, 2018, in the Korean Intellectual Property Office, the disclosure of which is incorporated herein in its entirety by reference.

BACKGROUND

1. Field

Example embodiments of the present disclosure relate to see-through type display apparatuses.

2. Description of the Related Art

A head-mounted display that provides virtual reality (VR) is now in the stage of commercialization, and has been widely applied in the entertainment industry. In addition, the head-mounted display is being developed for applications in medical, educational, and industrial fields.

An augmented reality (AR) display that is an advanced form of a VR display is an image apparatus combining the real world and VR, and has a characteristic that facilitates interactions between reality and virtuality. Interactions between reality and virtuality is based on a function of providing information about a real situation in real-time and may improve the reality effect by showing a virtual object or information superimposed on an environment of the real world.

An optical system included in such a display includes a beam splitter, a convex lens, a concave mirror, etc., which increase a physical volume, and thus, becomes a cause for increasing the total volume of the optical system.

SUMMARY

Provided are see-through type display apparatuses.

Additional aspects will be set forth in part in the description which follows and, in part, will be apparent from the description, or may be learned by practice of the example embodiments of this disclosure.

According to an aspect of the disclosure, there is provided a display apparatus comprising: a display device configured to output a first image; an optical coupler configured to: combine the first image received through a first path from the display device with a second image received through a second path that is different from the first path, output, through an exit surface of the optical coupler, a first light corresponding to the first image in a first polarization and a second light corresponding to the second image in a second polarization; and a polarization selection optical system arranged on the exit surface of the optical coupler and configured to have different refractive power with respect to the first light of the first polarization and the second light of the second polarization.

The first polarization and the second polarization maybe linear polarizations that maybe perpendicular to each other.

The optical coupler may comprise: an optical waveguide comprising a first surface, a second surface, and the exit surface, wherein the first image is incident on the first surface and the second image is incident on the second surface; and a beam splitter arranged in the optical waveguide in an inclined manner with respect to the exit surface.

The beam splitter may comprise a polarization beam splitter that reflects the first light of the first image in the first polarization and transmits the second light of the second image in the second polarization.

The optical waveguide may further comprise a transmittance adjusting coating layer provided at least partially on the second surface and the exit surface to reduce a transmittance of light of the second image incident through the second surface and emitted from the optical coupler without passing through the polarization beam splitter.

The optical coupler may further comprise: a first polarizer arranged between the display device and the optical waveguide to transform the first image into a first polarization state; and a second polarizer arranged on the second surface of the optical waveguide to transform the second image into a second polarization state.

The beam splitter may comprise a half mirror.

The polarization selection optical system may comprise a polarization selection lens configured to have refractive power with respect to light of a certain polarization and to not have refractive power with respect to light of a polarization different from the certain polarization The polarization selection lens may have the refractive power with respect to the light of the certain polarization, the refractive power being adjustable according to a control signal from outside the display apparatus.

The polarization selection lens may further configured to have a positive refractive power with respect to the light of the first polarization and to not have refractive power with respect to the light of the second polarization.

The polarization selection lens may further configured to have a positive refractive power with respect to light of a first circular polarization and to not have refractive power with respect to light of a second circular polarization that is opposite to the first circular polarization.

The polarization selection optical system may further comprise a quarter-wave plate arranged between the exit surface and the polarization selection lens.

An incident surface of the polarization selection lens maybe parallel with the exit surface of the optical coupler.

The polarization selection lens may comprise an optical anisotropic material having different refractive indices with respect to the light of the certain polarization and light of another polarization that is different from the certain polarization.

The polarization selection lens may comprise a diffraction-based lens.

The polarization selection lens may comprise: a half mirror; a reflective polarizer; and a quarter-wave plate arranged between the half mirror and the reflective polarizer.

The display apparatus may further comprise an aberration correcting optical member configured to correct optical aberration corresponding to the first image.

The aberration correcting optical member may comprise a lens arranged between the display device and the first surface.

A shape of a curved surface of the lens or a location of the lens on an optical axis maybe adjusted according to a control signal from outside the display apparatus.

The optical waveguide may further comprise a third surface between the second surface and the exit surface, the third surface being away from the first surface, and the aberration correcting optical member is a mirror arranged on the third surface.

A shape of a curved surface in the mirror or a location of the mirror on an optical axis maybe adjusted according to a control signal from outside the display apparatus.

According to another aspect of the disclosure there is provided a display apparatus comprising: a display device configured to output a first image; an optical coupler configured to: combine the first image received through a first path from the display device with a second image received through a second path that is different from the first path, and output a first light corresponding to the first image in a first polarization and a second light corresponding to the second image in a second polarization through an exit surface of the optical coupler; a polarization selection optical system arranged on the exit surface of the optical coupler and configured to have different refractive power with respect to the first light of the first polarization and the second light of the second polarization; a variable optical device arranged on an optical path along which the first image travels towards the polarization selection optical system; and a processor configured to control the variable optical device to control a characteristic of the first image.

The variable optical device may comprise a lens or a mirror having a variable refractive power and is configured to adjust a location of the lens or the mirror on an optical axis or adjust the variable refractive power.

The processor may further configured to set a range for controlling the variable optical device according to depth information of the first image.

The processor may further configured to set a range for controlling the variable optical device according to eyesight information of an observer.

The processor may further configured to adjust a range for controlling the variable optical device according to depth information of the first image and eyesight information of an observer.

According to another aspect of the disclosure, there is provided a display apparatus comprising: a display device configured to output a first image; an optical coupler configured to: combine the first image received through a first path from the display device with a second image received through a second path that is different from the first path, and output a first light corresponding to the first image in a first polarization and a second light corresponding to the second image in a second polarization through an exit surface; a polarization selection optical system arranged on the exit surface of the optical coupler and configured to have a first refractive power with respect to the first light of the first polarization and a second refractive power with respect to the second light of the second polarization, the first refractive power being different from the second refractive power; and a processor configured to generate a control signal to control at least one of the first refractive power and the second refractive power of the polarization selection optical system.

The processor may further configured to adjust the first refractive power according to depth information of the first image.

The processor may further configured to adjust the second refractive power according to eyesight information of an observer.

The processor may further configured to adjust the first refractive power according to depth information of the first image and adjust the second refractive power according to eyesight information of an observer.

The display apparatus may further comprise a variable optical device arranged on an optical path along which the first image travels towards the polarization selection optical system.

The variable optical device may comprise a lens or a mirror having a third refractive power and configured to adjust a location of the lens or the mirror on an optical axis or adjust the third refractive power.

The processor may further configured to adjust the third refractive power or the location according to depth information of the first image.

The processor may further configured to adjust the third refractive power or the location according to eyesight information of an observer.

The display apparatus may be a wearable see-through type display device.

According to another aspect of the disclosure, there is provided a display apparatus comprising: an optical waveguide comprising: a first surface which receives a first image; a second surface which receives a second image; and a third surface which outputs a combined image; an optical element provided inside the optical waveguide, the optical element being configured to combine the first image and the second image to produce the combined image; and a polarization selection element provided on the third surface of the optical waveguide.

The optical element maybe one of a beam splitter or a half mirror.

The polarization selection element maybe a lens.

The polarization selection element maybe configured to have refractive power to the output combined image based on a polarization of a first light corresponding to the first image and a second light corresponding to the second image.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
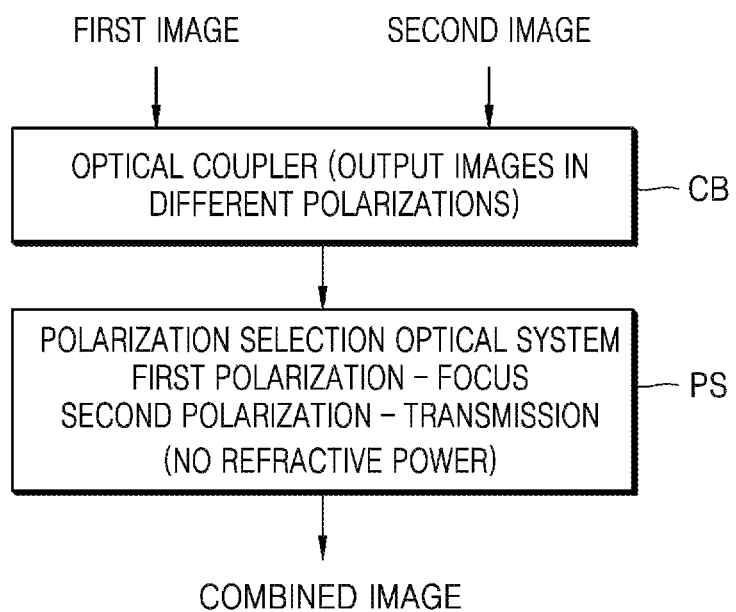
FIG. 1 is a conceptual diagram illustrating a see-through type display apparatus according to an example embodiment that provides an observer with a combined image.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments of the present disclosure will be described in detail with reference to accompanying drawings. In the drawings, like reference numerals denote like components, and sizes of components in the drawings may be exaggerated for convenience of explanation. The example embodiments of the disclosure are capable of various modifications and may be embodied in many different forms.

When a layer, a film, a region, or a panel is referred to as being "on" another element, it may be directly on the other layer or substrate, or intervening layers may also be present.

An expression used in the singular encompasses the expression of the plural, unless it has a clearly different meaning in the context. Throughout the specification, when a portion "includes" an element, another element may be further included, rather than excluding the existence of the other element, unless otherwise described.

As used herein, in particular, terms such as "the" and demonstratives similar thereto used herein may be to indicate both the singular and the plural.

Also, the steps of all methods described herein may be performed in any suitable order unless otherwise indicated herein or otherwise clearly contradicted by context. The disclosure is not limited to the described order of the steps. The use of any and all examples, or example language (e.g., "such as") provided herein, is intended merely to better illuminate the disclosure and does not pose a limitation on the scope of the present disclosure unless otherwise claimed.

Figure 2A:
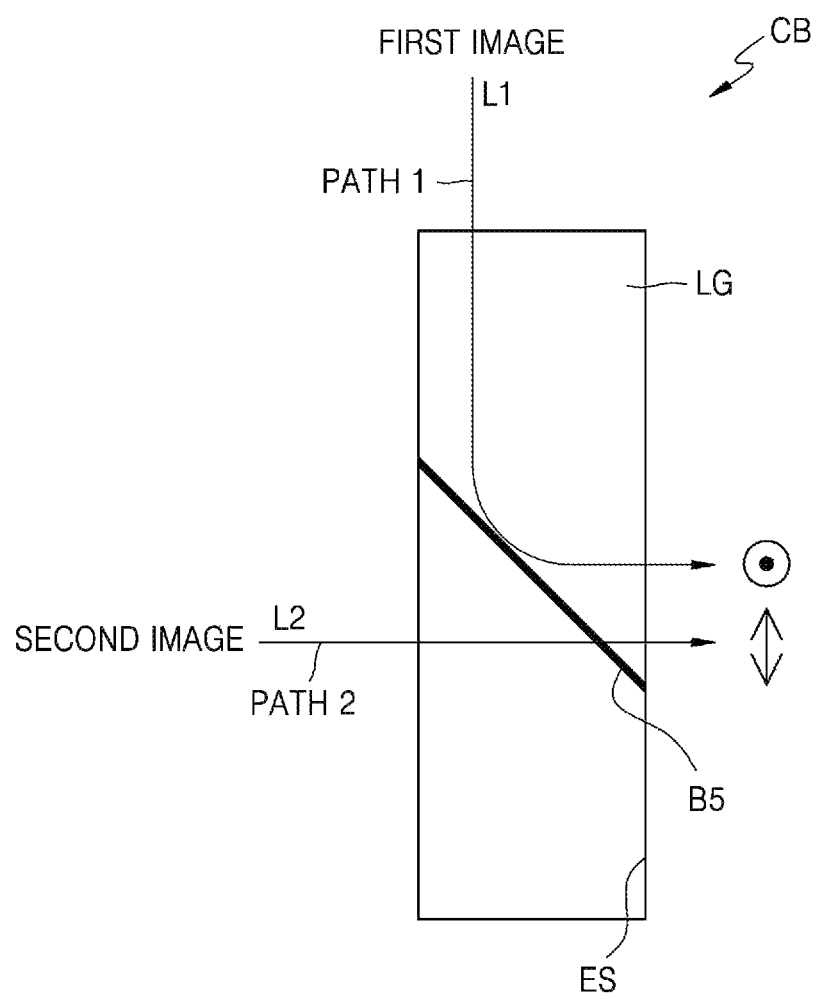
FIG. 2A is a diagram of an optical path, in which light from different paths are coupled and output in different polarizations by an optical coupler provided in a see-through type display apparatus according to an example embodiment.
Figure 2B:
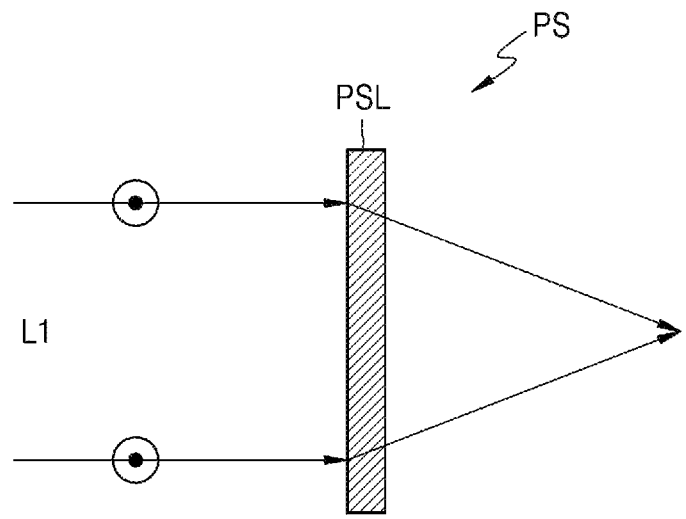
FIGS. 2B and 2C are diagrams illustrating a polarization selection optical system provided in a see-through type display apparatus according to an example embodiment that performs optical effects, which vary depending on light of different polarizations.
Figure 2C:
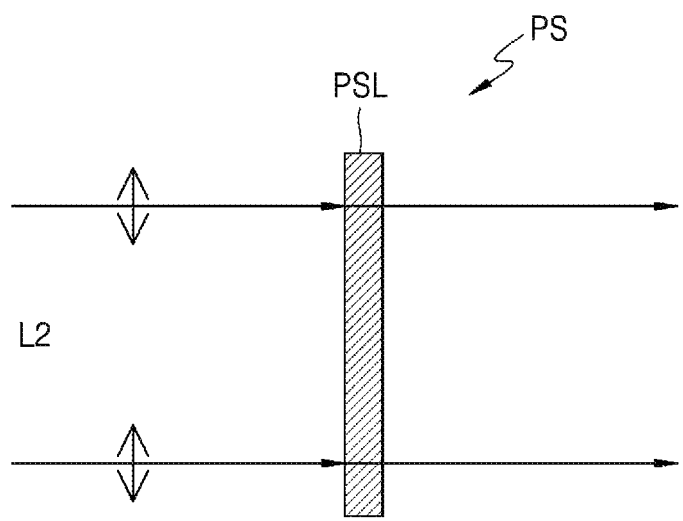

FIG. 1 is a conceptual diagram illustrating a see-through type display apparatus according to an example embodiment that provides an observer with a combined image. FIG. 2A is a diagram of an optical path, in which light from different paths is coupled and output in different polarizations by an optical coupler provided in a see-through type display apparatus according to an example embodiment, and FIGS. 2B and 2C are diagrams showing a polarization selection optical system provided in a see-through type display apparatus according to an example embodiment that performs optical effects which vary depending on light of different polarizations.

The see-through type display apparatus according to the example embodiment may combine a first image with a second image, wherein the first and second images come from different paths, and provide an observer with a combined image. The see-through type display apparatus includes an optical coupler CB and a polarization selection optical system PS.

As illustrated in FIG. 2, the optical coupler CB combines the first image with the second image incident to the optical coupler CB from a path different from that of the first image and outputs the combined image through an exit surface ES. Here, the optical coupler CB outputs the two images as light of different polarizations. For example, light L1 of the first image may be output as light of a first polarization (⊙), and light L2 of the second image may be output as light of a second polarization (↕). The first polarization ⊙ and the second polarization ↕ may be linear polarizations perpendicular to each other. However, one or more example embodiments are not limited to the above example. In accompanying drawings, even when there is no specific description, the light L1 of the first image is output in the first polarization ⊙ state and the light L2 of the second image is output in the second polarization ↕ state from the optical coupler CB.

The optical coupler CB may include an optical waveguide LG and a beam splitter BS arranged in the optical waveguide LG. The beam splitter BS may be arranged on an optical path, along which the light L1 of the first image and the light L2 of the second image pass, in the optical waveguide LG to be inclined with the exit surface ES. For example, an angle between the beam splitter BS and the exit surface ES may be 45°. The beam splitter BS may be a polarized beam splitter. According to an example embodiment, the beam splitter may reflect the light of the first polarization ⊙ and may transmit the light of the second polarization ↕. The light L1 of the first image may proceed along the optical waveguide LG and then change the optical path when the first polarization ⊙ component is reflected by the beam splitter BS. When the light L1 of the first image and the light L2 of the second image from a different path encounter the beam splitter BS, the second polarization ↕ component passes through the beam splitter BS. Accordingly, the light L1 of the first image may be emitted in the first polarization ⊙ state and the light L2 of the second image may be emitted in the second polarization ↔ state from the optical coupler CB through the same exit surface ES. According to an example embodiment, the light L1 of the first image may proceed along the optical waveguide LG by total internal reflection of the waveguide LG.

While FIG. 2A conceptually describes the configuration in which the optical coupler CB emits the light L1 of the first image in the first polarization ⊙ state and the light L2 of the second image in the second polarization ↕ state, detailed shape of the optical coupler CB may be vary with modified forms of the optical waveguide LG and the beam splitter BS, and other additional optical elements according to different embodiments.

Referring to FIGS. 2B and 2C, the polarization selection optical system PS may have refractive power that varies depending on the light of the first polarization ⊙ and the light of the second polarization ↕ output from the optical coupler CB. To do this, the polarization selection optical system PS may include a polarization selection lens PSL performing different optical functions on two different polarizations.

As shown in FIG. 2B, the polarization selection lens PSL included in the polarization selection optical system PS applies positive refractive power with respect to the light of the first polarization ⊙. That is, the polarization lens PSL may focus the light L1 of the first image and perform imaging of the first image at a desired location like a focusing lens. The first image may be formed by, for example, a display device, and the polarization selection lens PSL performs a focusing function that is the last stage of an imaging optical system.

Referring to FIG. 2C, the polarization selection lens PSL included in the polarization selection optical system PS may rarely have the refractive power with respect to the light of the second polarization ↕. This may denote that the refractive power with respect to the light of the second polarization ↕ is very small or little as compared with the refractive power with respect to the light of the first polarization ⊙. The light L2 of the second image in the second polarization ↕ state may include, for example, a real world scene that is not necessarily focused for recognizing the image.

FIGS. 2B and 2C show that the polarization selection lens PSL has different refractive effects on different linear polarizations, but one or more embodiments are not limited thereto. The polarization selection lens PSL may have different refractive actions on circular polarizations in different directions, and in this case, the polarization selection optical system PS may further include a quarter-wave plate on a path of the light incident on the polarization selection lens PSL.

An observer may simultaneously recognize the first image and the second image through the optical coupler CB and the polarization selection optical system PS. The first image may be a virtual reality (VR) image generated by a display device to include additional information about the second image that is the real world image. As described above, the optical coupler CB and the polarization selection optical system PS may be applied to an augmented reality (AR) display apparatus.

The polarization selection lens PSL provided in the polarization selection optical system PS may include an optical anisotropic material having different refractive indices with respect to light of two different polarizations, or may include a diffraction-based lens such as a geometric phase lens or a meta lens.

Exemplary configurations of the polarization selection lens PSL will be described below with reference to FIGS. 3A to 3F.

Figure 3A:
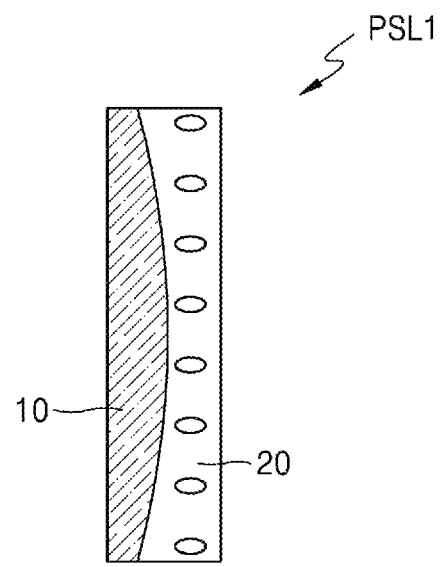
FIGS. 3A to 3G are diagrams showing examples of a polarization selection lens provided in a polarization selection optical system according to an example embodiment.

Referring to FIG. 3A, a polarization selection lens PSL1 may include a refractive lens 10 and a liquid crystal layer 20. According to an example embodiment, the liquid crystal layer 20 may include liquid crystal molecules. A liquid crystal molecule is a material having optical anisotropy, and applies different refractive indices with respect to light that is in parallel with a major axis direction of the liquid crystal molecule and light that is in parallel with a minor axis direction of the liquid crystal molecule. Alignment of the liquid crystal molecules may be electrically controlled and may be adjusted so as to have different refractive indices with respect to desired light of two different polarizations. The refractive lens 10 may include an optical isotropic material and may have a predetermined curved surface. The refractive index of the refractive lens 10 may be set to be identical with a refractive index of the liquid crystal layer 20 with respect to one polarization, so that the polarization selection lens PSL1 does not have the refractive power with respect to one polarization and applies the refractive power only with respect to one another polarization.

Figure 3B:
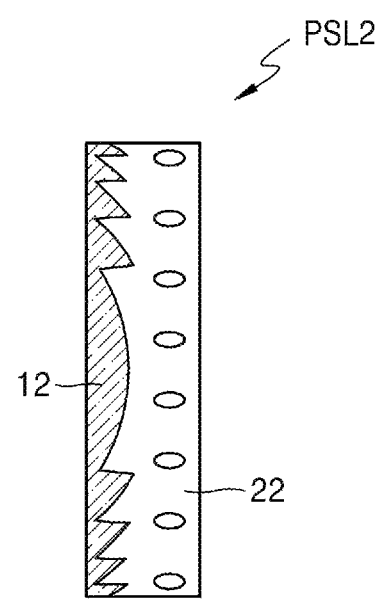

Referring to FIG. 3B, a polarization selection lens PSL2 may include a Fresnel lens 12 and a liquid crystal layer 22. The polarization selection lens PSL2 may be a modified example of the polarization selection lens PSL1 shown in FIG. 3A. The Fresnel lens 12 has a reduced thickness by splitting and rearranging the curved surface of the refractive lens 10 of FIG. 3A. The Fresnel lens 12 may have substantially the same functions as those of the refractive lens 10. Therefore, the structure of FIG. 3A or the structure of FIG. 3B may be selected taking into account the curved surface shape to be formed. For example, when the curved surface to be formed has a small radius of curvature and is large in thickness, the thickness may be reduced by using the Fresnel lens 12.

Figure 3C:
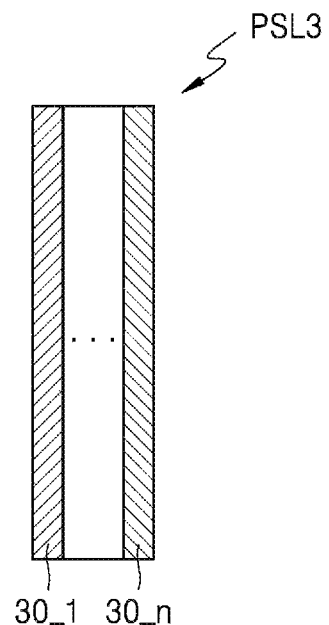

Referring to FIG. 3C, a polarization selection lens PSL3 includes a plurality of optical anisotropic material layers 30_1 to 30_n, where n is an integer greater than 1. The plurality of optical anisotropic material layers 30_1 to 30_n having different refractive indices are stacked to represent the refractive index that is different according to the polarization.

Figure 3D:
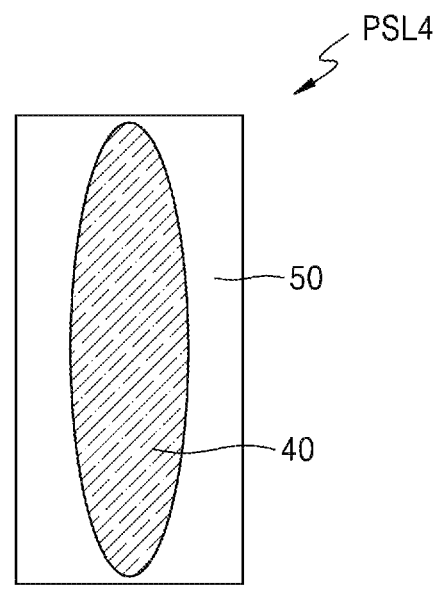

Referring to FIG. 3D, a polarization selection lens PSL4 includes a birefringent crystal 40 and index oil 50. The birefringent crystal 40 may be formed by processing a material having a birefringent property as a lens. The birefringent crystal 40 may be arranged in the index oil 50. The index oil 50 may have a refractive index that is the same as one certain refractive index represented by the birefringent crystal 40.

Figure 3E:
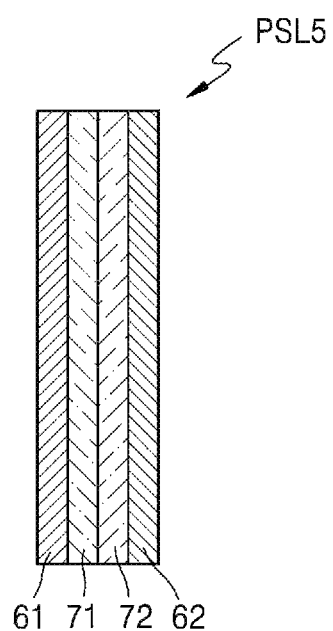

Referring to FIG. 3E, a polarization selection lens PSL5 includes a plurality of diffraction-based lenses 61 and 62 and a plurality of optical films 71 and 72. The diffraction-based lenses 61 and 62 may include geometric phase lenses or meta lenses. The geometric phase lens may geometrically modulate a phase by using a non-linear material element. For example, various geometric phases may be formed by adjusting the orientation state of the liquid crystal. The meta lens may include nanostructures having sub-wavelength dimensions. Shapes and arrangement of the nanostructures having the dimensions that are less than the wavelength of incident light may be appropriately set to represent a desired refractive index according to the polarization.

The diffraction-based lenses 61 and 62 may indicate conjugation optical characteristics according to the polarization, and the optical films 71 and 72 such as a polarizer, a phase retarder, etc. maybe arranged to indicate the desired refractive power according to the polarization.

Figure 3F:
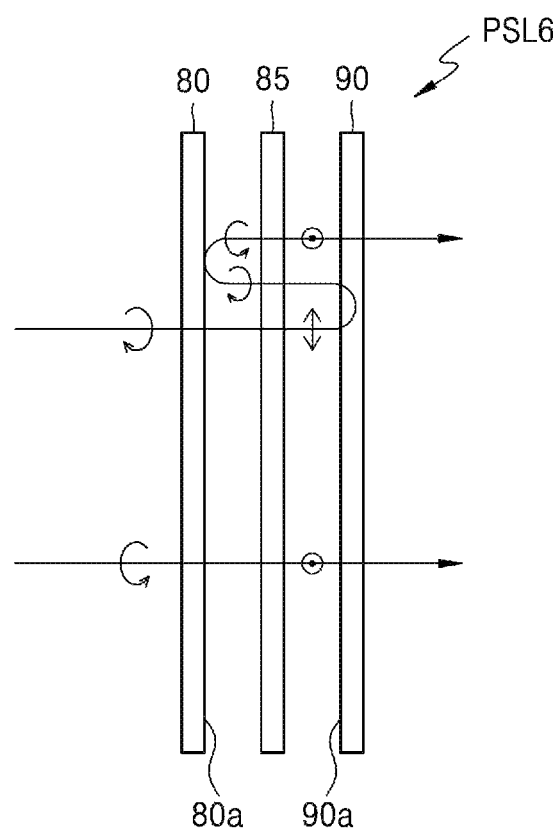

Referring to FIG. 3F, a polarization selection lens PSL6 includes a half mirror 80, a quarter-wave plate 85, and a reflective polarizer 90 that are sequentially arranged according to a proceeding direction of light.

The polarization selection lens PSL6 may have the refracting operation that is different according to, for example, circular polarization. When light of clockwise circular polarization is incident, the light is transformed to light of second polarization ↕ while passing through the quarter-wave plate 85, and thus, reflected by the reflective polarizer 90 that reflects the light of the second polarization ↕. Thereafter, the light reflected by the polarizer 90 becomes the clockwise circular polarization while passing through the quarter-wave plate 85, which is then reflected by the half mirror 80 to be the light of counter-clockwise circular polarization. The counter-clockwise circularly polarized light is transformed into the light of the first polarization ⊙ while passing through the quarter-wave plate 85, and passes through the reflective polarizer 90. In the above optical path, the refraction operation of the light may be adjusted according to a shape of a reflective surface 90a of the reflective polarizer 90 and a shape of a reflective surface 80a of the half mirror 80, wherein the light is reflected by the reflective polarizer 90, reflected by the half mirror 80, and then, passes through the reflective polarizer 90. That is, the light of clockwise circular polarization incident on the polarization selection lens PSL6 is refracted by the combination of the reflective surface 80a of the half mirror 80 and the reflective surface 90a of the reflective polarizer 90. The above refraction may be, for example, positive refractive power.

When the light of counter-clockwise circular polarization is incident on the polarization selection lens PSL6, the light is transformed into the first polarization 0 by the quarter-wave plate 85 and passes through the reflective polarizer 90. The light of the counter-clockwise circular polarization incident into the polarization selection lens PSL6 is not reflected by the half mirror 80 or the reflective polarizer 90, but passes through the polarization selection lens PSL6. Accordingly, the light is refracted differently from the light of the clockwise circular polarization. The above refraction may be, for example, performed by refractive power that is much smaller than that applied to the light of the clockwise circular polarization or by little refractive power.

The polarization selection lens PSL6 may have different refraction operations with respect to the light of the clockwise circular polarization and the light of the counter-clockwise circular polarization by appropriately combining the shape of the reflective surface 80a of the half mirror 80 and the reflective surface 90a of the reflective polarizer 90, for example, may have the positive refractive power to the light of the clockwise circular polarization and may operate in a mode with little refractive power with respect to the light of the counter-clockwise circular polarization.

Figure 3G:
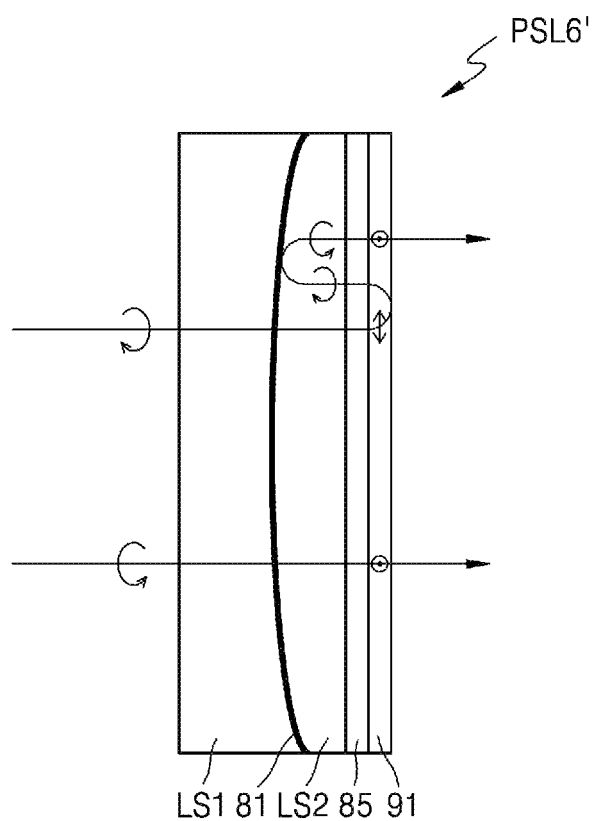

A polarization selection lens PSL6' of FIG. 3G is an example of adopting principles of the polarization selection lens PSL6 shown in FIG. 3F, and includes a first lens LS1, a half mirror 81, a second lens LS2, a quarter-wave plate 85, and a reflective polarizer 91. A bonding surface of the first lens LS1 and the second lens LS2 is a curved surface, to which a half-mirror coating may be applied.

When the light of the clockwise circular polarization is incident on the polarization selection lens PSL6', the light is transformed into the light of the second polarization ↕ while passing through the quarter-wave plate 85, is reflected by the reflective polarizer 91 that reflects the light of the second polarization ↕, and then, is transformed into the light of the clockwise circular polarization while passing through the quarter-wave plate 85. The light of the clockwise circular polarization is reflected by the half mirror 81 to be the light of counter-clockwise circular polarization and then is transformed into the light of the first polarization ⊙ while passing through the quarter-wave plate 85, and passes through the reflective polarizer 91. The light of the clockwise circular polarization incident on the polarization selection lens PSL6' is refracted by the half mirror 81 having a concave reflective surface.

When the light of counter-clockwise circular polarization is incident on the polarization selection lens PSL6', the light is transformed into the first polarization ⊙ by the quarter-wave plate 85 and passes through the reflective polarizer 91. The light of the counter-clockwise circular polarization incident on the polarization selection lens PSL6' passes through the polarization selection lens PSL6' without being reflected by the half mirror 81 or the reflective polarizer 91, that is, the polarization selection lens PSL6' rarely applies the refractive power with respect to the light of the counter-clockwise circular polarization.

In FIG. 3G, the first lens LS1 and the second lens LS2 are arranged to provide a coating surface for forming the half mirror 81, and are not limited thereto, and the first and second lenses LS1 and LS2 may be omitted. For example, a concave half mirror may be provided without using the first lens LS1 and the second lens LS2.

FIG. 3G shows an example of a polarization selection lens illustrated in FIG. 3F, and includes various shape combinations adopting the principle of the polarization selection lens PSL6 illustrated with reference to FIG. 3F and additional optical elements to have different refractive powers with respect to different polarizations.

Hereinafter, the see-through type display apparatuses according to example embodiments will be described below.

Figure 4:
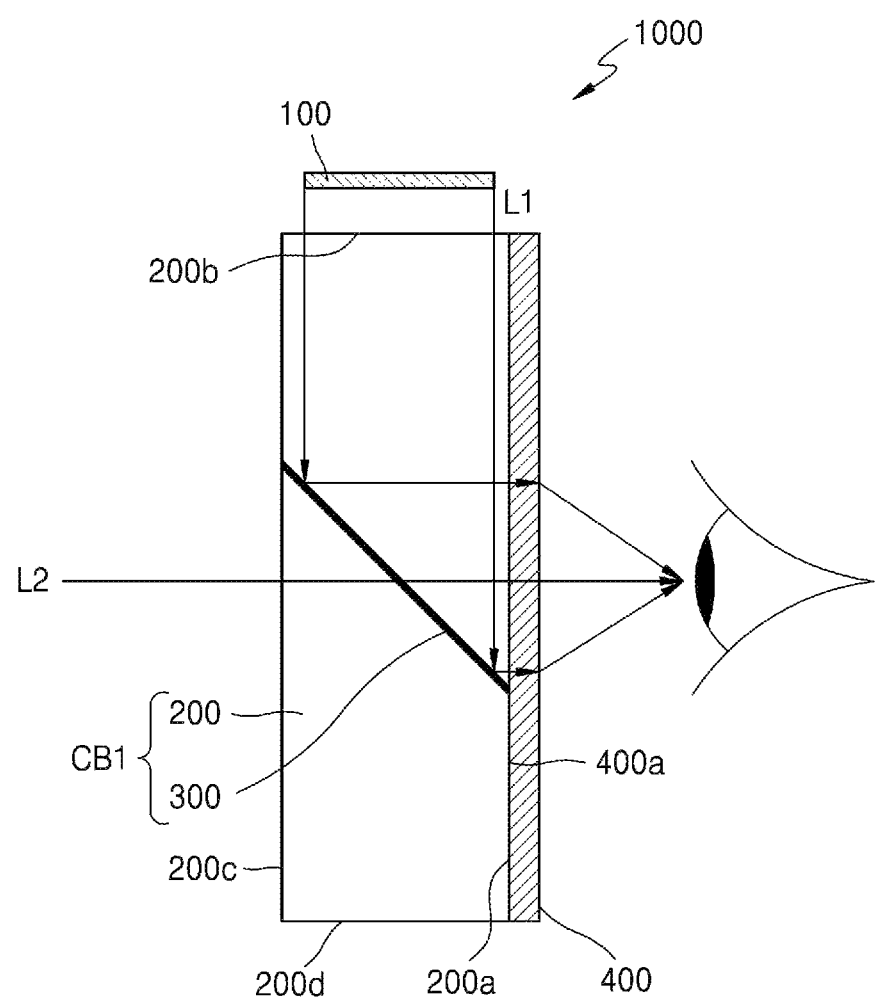
FIG. 4 is a diagram of a structure and an optical arrangement of a see-through type display apparatus according to an example embodiment.

FIG. 4 is a diagram of a structure and an optical arrangement of a see-through type display apparatus 1000 according to an example embodiment.

The see-through type display apparatus 1000 according to the example embodiment includes a display device 100, an optical coupler CB1, and a polarization selection lens 400.

The display device 100 modulates light according to first image information to form light L1 of a first image. The first image may be a two-dimensional image or a three-dimensional image, and the three-dimensional image may include a hologram image, a stereo image, a light field image, an integral photography (IP) image, a multi-view or super multi-view type image, etc.

The display device 100 may include, for example, a liquid crystal on silicon (LCoS) device, a liquid crystal display (LCD) device, an organic light-emitting diode (OLED) display device, a digital micromirror device (DMD), or a next generation display device such as micro LED, quantum dot (QD) LED, etc.

The optical coupler CB1 couples the light L1 of the first image from the display device 100 and light L2 of a second image from a different path and emits the combined light in different polarizations. According to an example embodiment, the optical coupler CB1 includes an optical waveguide 200 and a beam splitter 300.

The optical waveguide 200 includes an exit surface 200a, from which the light is emitted. Further, the optical coupler CB1 includes a first surface 200b to which the light L1 of the first image is incident, a second surface 200c to which the light L2 of the second image is incident, and a third surface 200d facing the first surface 200b between the exit surface 200a and the second surface 200c.

The beam splitter 300 may be arranged in the optical waveguide 200 to be inclined with respect to the exit surface 200a. The beam splitter 300 is a polarized beam splitter which reflects light of a first polarization and transmits light of a second polarization. The first polarization and the second polarization may be linear polarizations perpendicular to each other. The light L1 of the first image and the light L2 of the second image, which are incident through different paths, proceed in a same path after passing through the beam splitter 300 and are emitted from the exit surface 200a respectively in the first polarization state and the second polarization state.

The polarization selection optical system may include a polarization selection lens 400 that applies refractive power with respect to the light of the first polarization and does not have refractive power with respect to the light of the second polarization. The polarization selection lens PSL1, PSL2, PSL3, PSL4, PSL5, or PSL6 illustrated with reference to FIGS. 3A to 3F, or a modified example thereof may be provided as the polarization selection lens 400. According to another example embodiment, the polarization selection lens may be provided as part of a polarization selection optical system.

An incident surface 400a of the polarization selection lens 400 may be in parallel with the exit surface 200a of the optical coupler CB1. Therefore, a distance between the optical coupler CB1 and the polarization selection lens 400 may be reduced, and desired optical performance may be achieved while reducing the total volume of the see-through type display apparatus 1000.

Figure 5:
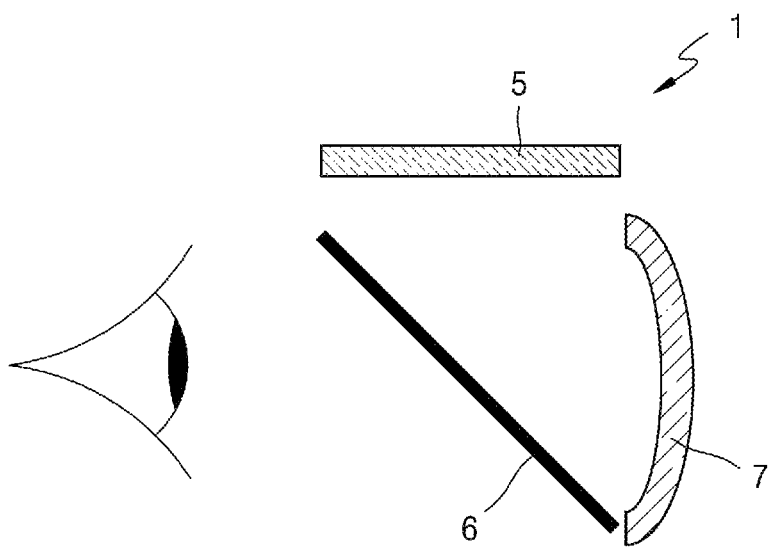
FIG. 5 is a diagram of an optical arrangement in a see-through type display apparatus according to a comparative example.

FIG. 5 is a diagram of an optical arrangement in a see-through type display apparatus 1 according to a comparative example.

The see-through type display apparatus 1 according to a comparative example includes a display device 5, a beam splitter 6, and a concave mirror 7. Light from the display device 5 reaches an observer after reflecting from the concave mirror 7. However, due to the characteristics of this optical path, a volume of the optical system may increase. Moreover, an additional increase in the volume may occur with implementation of desired optical performance. For example, in order to increase the refractive power of the concave mirror 7, a total volume may increase further.

Unlike the see-through type display apparatus according to the comparative example, the see-through type display apparatus 1000 according to the example embodiment includes the optical coupler CB1, in which the beam splitter 300 is arranged in the optical waveguide 200, and the polarization selection lens 400, a distance of which from the optical coupler CB1 may be reduced, to achieve reduction in the volume and improvement in performance.

Figure 6:
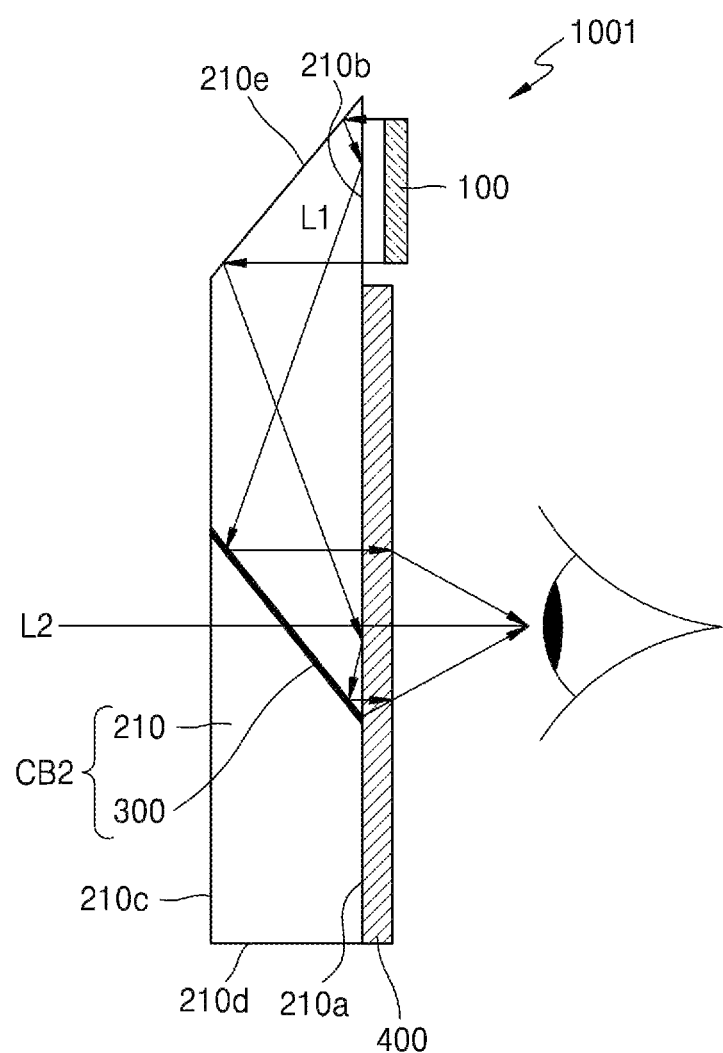
FIG. 6 is a diagram of a structure and an optical arrangement of a see-through type display apparatus according to another example embodiment.

FIG. 6 is a diagram of a structure and an optical arrangement of a see-through type display apparatus 1001 according to another example embodiment.

The see-through type display apparatus 1001 includes a display device 100, an optical coupler CB3, and the polarization selection lens 400. The see-through type display apparatus 1001 of the example embodiment is different from the see-through type display apparatus 1000 of FIG. 4 in view of a shape of an optical waveguide 210.

The optical waveguide 210 includes an exit surface 210a, from which the light is emitted, a first surface 210b to which the light L1 of the first image is incident, a second surface 210c to which the light L2 of the second image is incident, a mirror surface 210e adjacent to the first surface 210b and provided between the exit surface 210a and the second surface 210c, and a third surface 210d facing the mirror surface 210e between the exit surface 210a and the second surface 210c. The exit surface 210a is flush with the first surface 210b. The light L1 of the first image incident through the first surface 210b is reflected by the mirror surface 210e that is inclined with respect to the first surface 210b, proceeds in the optical waveguide 210 to reach the beam splitter 300, and then, is reflected by the beam splitter 300 and emitted through the exit surface 210a.

Due to a shape of the optical waveguide 210 and the arrangement of the display device 100, an incident angle of the light L1 from the display device 100 to the beam splitter 300 may be different from that of FIG. 4. Accordingly, the beam splitter 300 may be arranged to be more inclined than that of FIG. 4, for example, an angle between the beam splitter 300 and the exit surface 210a may be less than 45°. Also, a thickness of the optical waveguide 210 may be less than that of the optical waveguide 200 of FIG. 4.

Figure 7:
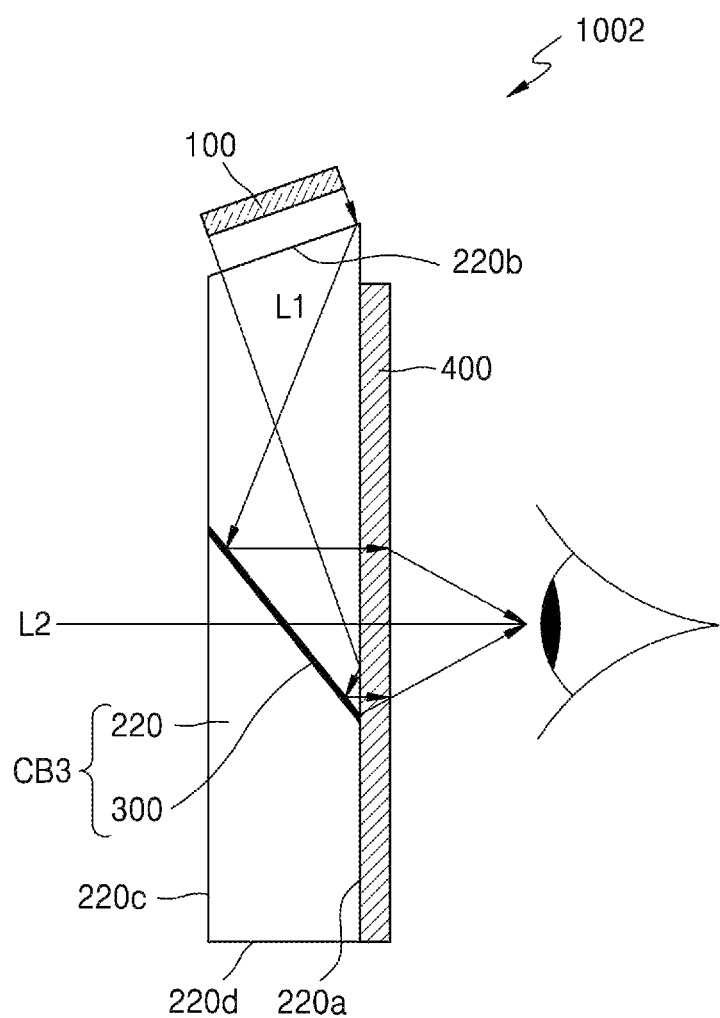
FIG. 7 is a diagram of a structure and an optical arrangement of a see-through type display apparatus according to another example embodiment.

FIG. 7 is a diagram of a structure and an optical arrangement of a see-through type display apparatus 1002 according to another example embodiment.

The see-through type display apparatus 1002 includes the display device 100, the optical coupler CB3, and the polarization selection lens 400.

The see-through type display apparatus 1002 of the example embodiment is different from the see-through type display apparatus 1000 of FIG. 4 in view of a shape of an optical waveguide 220.

The optical waveguide 220 includes an exit surface 220a from which the light is emitted, a first surface 220b to which the light L1 of the first image is incident, a second surface 220c to which the light L2 of the second image is incident, and a third surface 220d facing the first surface 220b between the exit surface 220a and the second surface 220c. The first surface 220b is arranged inclined unlike the first surface 210b in the see-through type display apparatus 1000 of FIG. 4.That is, an angle between the first surface 220b and the exit surface 220a may be less than 90°. Therefore, an incident angle of the light L1 of the first image that is incident through the first surface 220b to the beam splitter 300 may be different from that of FIG. 4. Accordingly, the beam splitter 300 may be arranged to be more inclined than that of FIG. 4, for example, an angle between the beam splitter 300 and the exit surface 220a may be less than 45°.

Also, a thickness of the optical waveguide 220 may be less than that of the optical waveguide 200 of FIG. 4.

Figure 8:
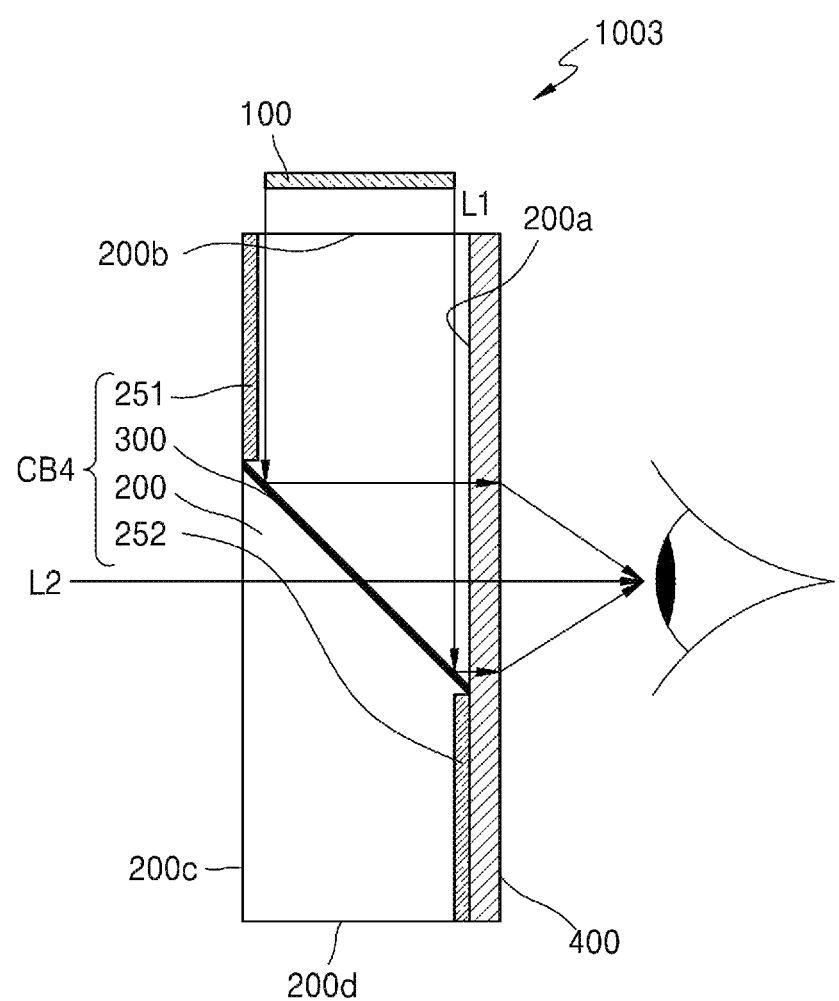
FIG. 8 is a diagram of a structure and an optical arrangement of a see-through type display apparatus according to another example embodiment.

FIG. 8 is a diagram of a structure and an optical arrangement of a see-through type display apparatus 1003 according to another example embodiment.

The see-through type display apparatus 1003 includes the display device 100, an optical coupler CB4, and the polarization selection lens 400.

The see-through type display apparatus 1003 according to the example embodiment is different from the see-through type display apparatus 1000 of FIG. 4 in that transmittance adjusting coating layers 251 and 252 are further formed on the optical waveguide 200.

The optical waveguide 200 includes the exit surface 200a from which the light is emitted, the first surface 200b to which the light L1 of the first image is incident, the second surface 200c to which the light L2 of the second image is incident, and the third surface 200d facing the first surface 200b between the exit surface 200a and the second surface 200c. In addition, the transmittance adjusting coating layers 251 and 252 are respectively formed at least partially on the second surface 200c and the exit surface 200a.

The transmittance adjusting coating layers 251 and 252 are provided to reduce transmittance of the light that is emitted from the optical coupler CB4 without passing through the beam splitter 300, from the light L2 of the second image incident through the second surface 200c.

When the beam splitter 300 is a polarization beam splitter, the beam splitter 300 includes a plurality of dielectric layers for polarization separation, and accordingly, the transmittance of the light L2 of the second image emitted from the exit surface 200a of the optical coupler CB4 varies depending on whether the light passes through the beam splitter 300 or does not pass through the beam splitter 300. When the transmittance adjusting coating layers 251 and 252 are provided on some regions of the second surface 200c and the exit surface 200a, the transmittance of the light L2 of the second image through the path, in which the light L2 does not pass through the beam splitter 300, and the transmittance through the path, in which the light L2 passes through the beam splitter 300, may be similar to each other. The transmittance adjusting coating layers 251 and 252 may include a material that is the same as that of the coating applied on the beam splitter 300 for polarization separation. However, the example embodiment is not limited thereto, and any type of coating material that may allow the light to have similar transmittances in two paths may be applied.

Locations of the transmittance adjusting coating layers 251 and 252 are not limited to the examples shown in the drawings. For example, the transmittance adjusting coating layer 251 may be formed on an opposite side of the exit surface 200a. Also, the transmittance adjusting coating layer 252 may be formed on an opposite side of the second surface 200c. That is, the transmittance adjusting coating layers 251 and 252 may be both formed on the second surface 200c or the exit surface 200a, or may be formed respectively on the exit surface 200a and the second surface 200c.

Figure 9:
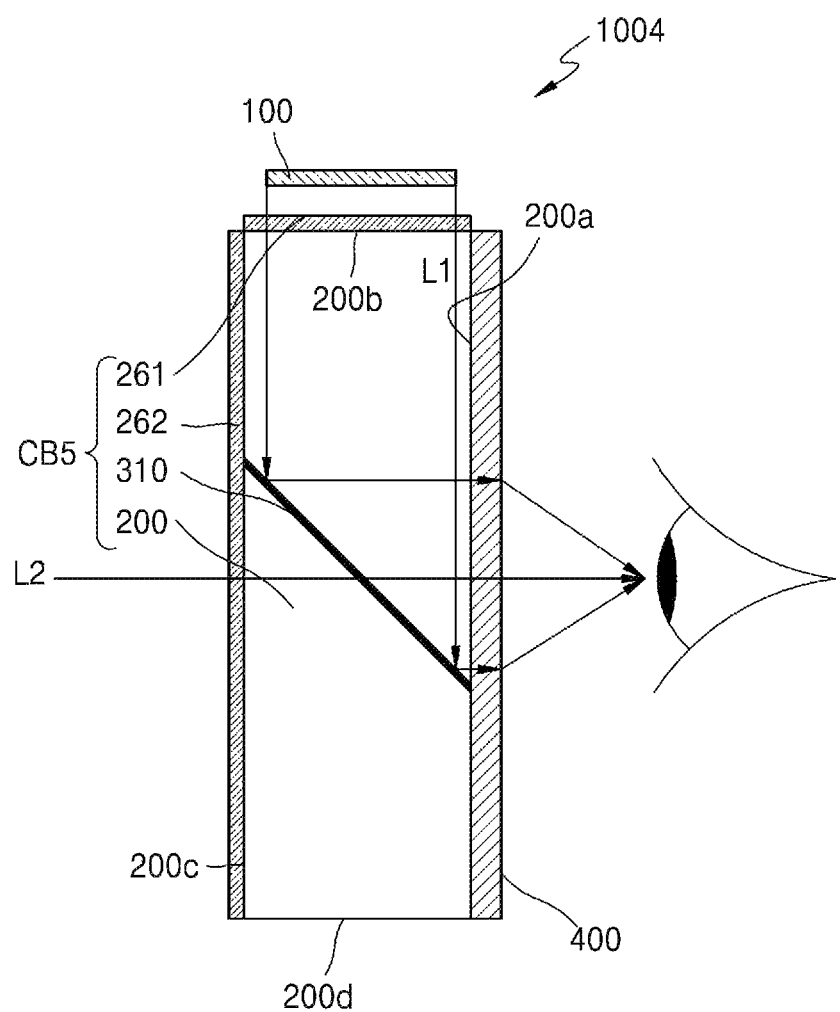
FIG. 9 is a diagram of a structure and an optical arrangement of a see-through type display apparatus according to another example embodiment.

FIG. 9 is a diagram of a structure and an optical arrangement of a see-through type display apparatus 1004 according to another example embodiment.

The see-through type display apparatus 1004 includes the display device 100, an optical coupler CBS, and the polarization selection lens 400.

The see-through type display apparatus 1004 of the example embodiment is different from the see-through type display apparatus 1000 of FIG. 4 in that a first polarizer 261 is arranged on the first surface 200b of the optical waveguide 200 and a second polarizer 262 is further arranged on the second surface 200c of the optical waveguide 200.

The first polarizer 261 only transmits the light of first polarization component and the second polarizer 262 only transmits the light of second polarization component in the incident light. Accordingly, the light L1 of the first image from the display device 100 is incident in the first polarization state and the light L2 of the second image is incident in the second polarization state to the optical waveguide 200, and then reach a beam splitter 310. In this case, the beam splitter 310 does not need to have the polarization separation function, and thus a half mirror may be used as the beam splitter 310.

Figure 10:
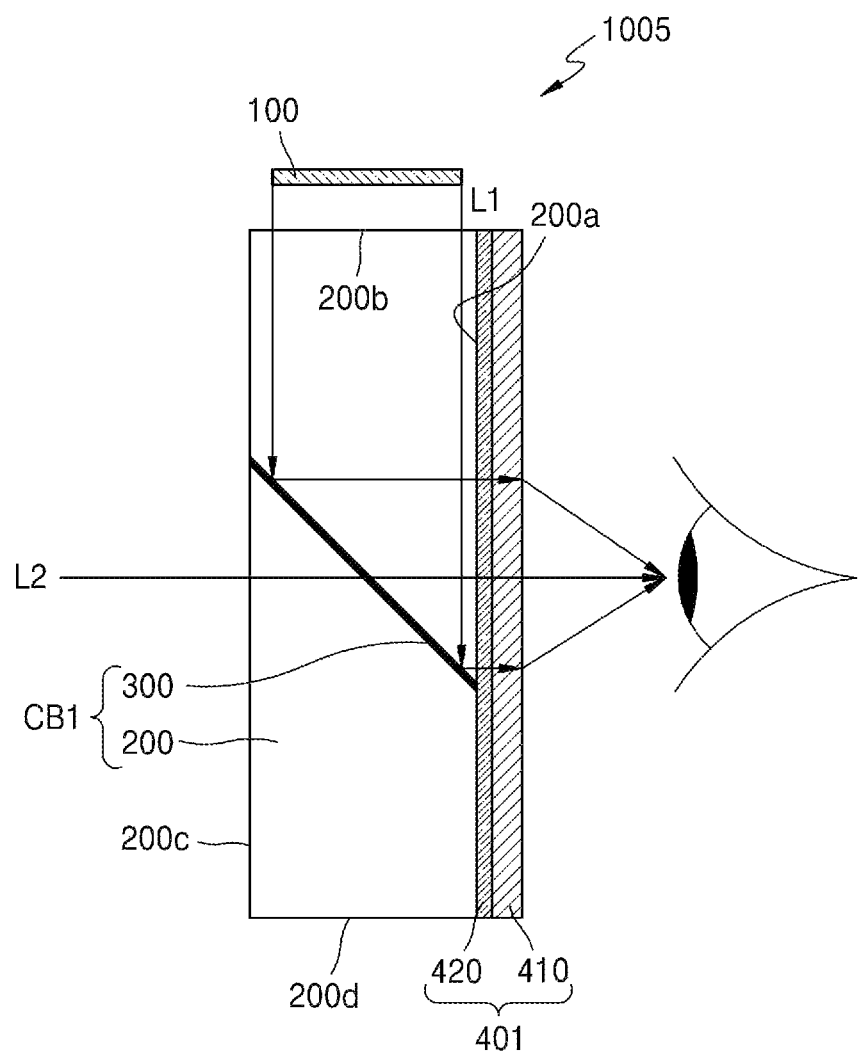
FIG. 10 is a diagram of a structure and an optical arrangement of a see-through type display apparatus according to another example embodiment.

FIG. 10 is a diagram of a structure and an optical arrangement of a see-through type display apparatus 1005 according to another example embodiment.

The see-through type display apparatus 1005 includes the display device 100, an optical coupler CB1, and the polarization selection optical system 401.

The see-through type display apparatus 1005 of the example embodiment is different from the see-through type display apparatus 1000 of FIG. 4 in that the polarization selection optical system 401 provides a polarization selection lens 410 that applies varying refractive power depending on a circular polarization component and further includes a quarter-wave plate 420.

The polarization selection lens 410 may be the examples shown in FIGS. 3A to 3E, a combination thereof, or a modification thereof, and a combination of optical anisotropic materials and other components may be selected so that the refractive power may vary with respect to two different circular polarization components, not two different linear polarization components that are perpendicular to each other. Otherwise, the polarization selection lens having different refractive powers with respect to two circular polarizations in different directions illustrated with reference to FIG. 3F may be used.

The polarization selection lens 410 may have the refractive power with respect to, for example, the light of clockwise circular polarization and may not have the refractive power with respect to the light of counter-clockwise circular polarization.

The quarter-wave plate 420 arranged between the optical coupler CB1 and the polarization selection lens 410 transforms the light L1 of the first image that is emitted from the optical coupler CB1 with the first polarization into the light of clockwise circular polarization and transforms the light L2 of the second image emitted from the optical coupler CB1 with the second polarization into the light of the counter-clockwise circular polarization. The polarization selection lens 410 may image the light L1 of the first image in the clockwise circular polarization with refraction operation and may transmit the light L2 of the second image in the counter-clockwise circular polarization without refraction operation.

Figure 11:
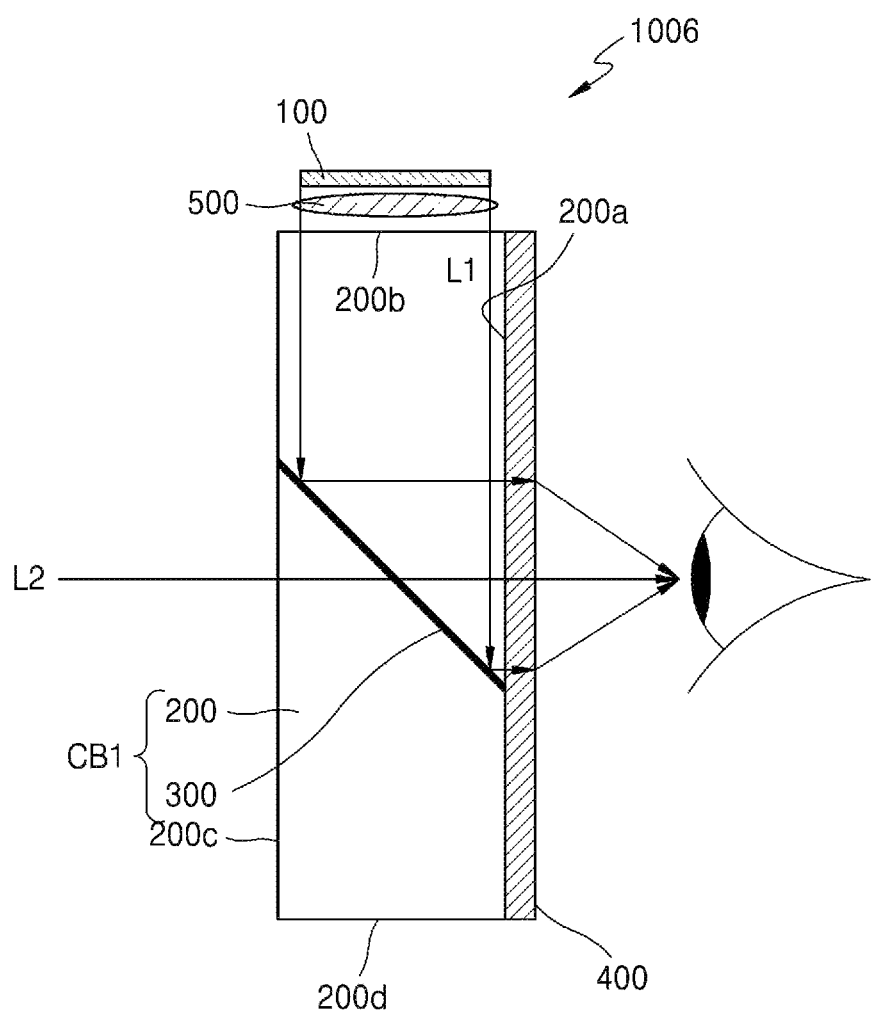
FIG. 11 is a diagram of a structure and an optical arrangement of a see-through type display apparatus according to another example embodiment.

FIG. 11 is a diagram of a structure and an optical arrangement of a see-through type display apparatus 1006 according to another example embodiment.

The see-through type display apparatus 1006 includes the display device 100, the optical coupler CB1, the polarization selection lens 400, and a convex lens 500 between the display device 100 and the optical coupler CB1.

The see-through type display apparatus 1006 of the example embodiment is different from those of the previous example embodiments, in view of further including an aberration correcting optical member. Imaging of the light L1 of the first image formed by the display device 100 by using only one lens may make it difficult to control the optical aberration, and thus, an additional optical member may be further provided to improve optical performance.

The see-through type display apparatus 1006 according to the example embodiment may further include the convex lens 500 for correcting aberration between the display device 100 and the optical waveguide 200. The convex lens 500 may be located between the display device 100 and the first surface 200b. The imaging optical performance may be further improved by using the convex lens 500. In FIG. 11, the see-through type display apparatus 1000 of FIG. 4 is shown to further include the convex lens 500, but embodiments are not limited thereto, and the see-through type display apparatus according to other embodiments may further include the convex lens 500.

Figure 12:
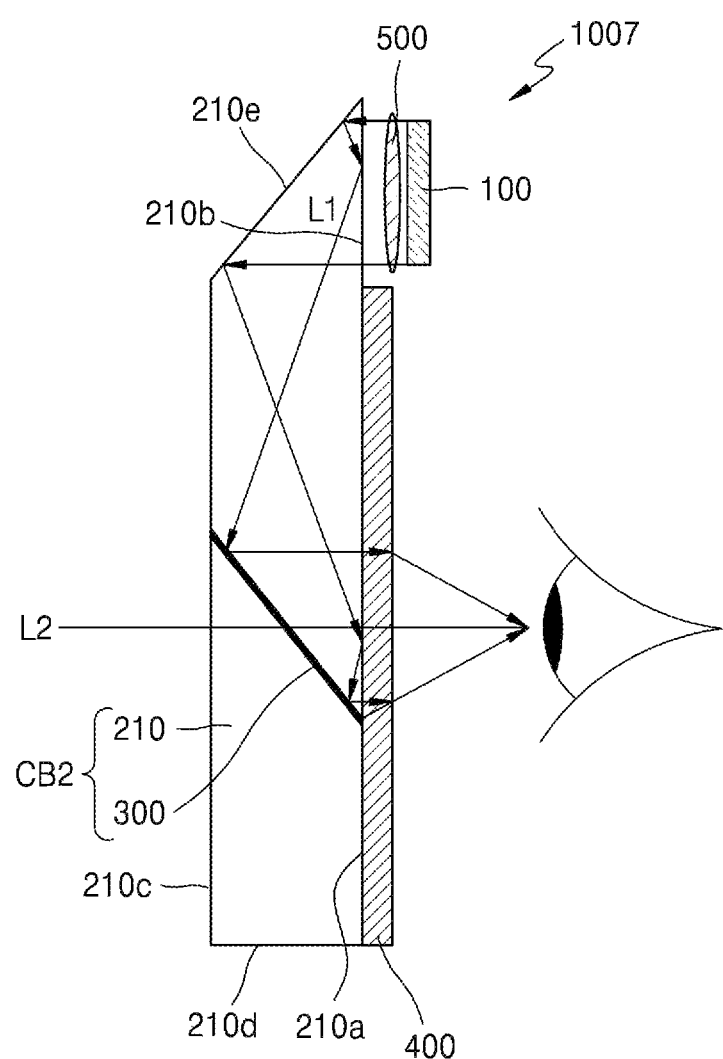
FIG. 12 is a diagram of a structure and an optical arrangement of a see-through type display apparatus according to another example embodiment.

FIG. 12 is a diagram of a structure and an optical arrangement of a see-through type display apparatus 1007 according to another example embodiment.

The see-through type display apparatus 1007 includes the display device 100, the optical coupler CB2, the polarization selection lens 400, and the convex lens 500 between the display device 100 and the optical coupler CB2.

The see-through type display apparatus 1007 corresponds to the see-through type display apparatus 1001 of FIG. 6, in which the convex lens 500 is further arranged, that is, as shown in FIG. 12, the convex lens 500 may be arranged between the display device 100 and the first surface 210b of the optical waveguide 210. The imaging optical performance may be further improved by using the convex lens 500.

Figure 13:
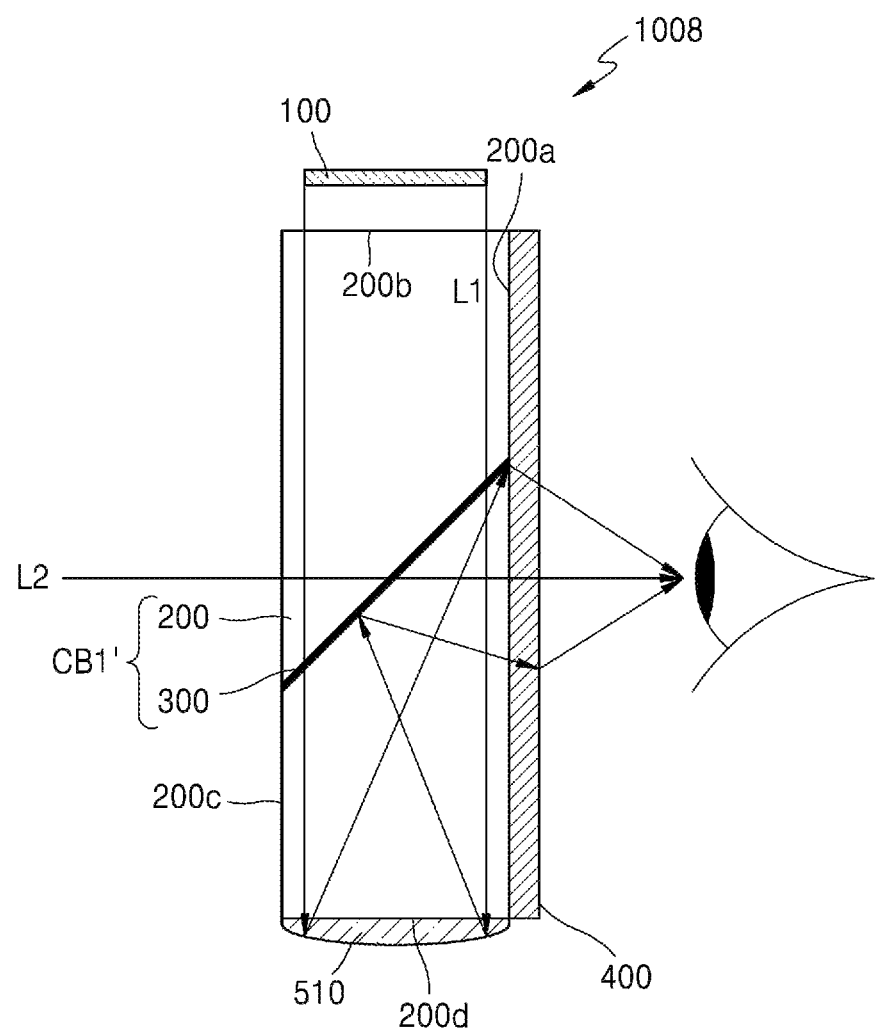
FIG. 13 is a diagram of a structure and an optical arrangement of a see-through type display apparatus according to another example embodiment.

FIG. 13 is a diagram of a structure and an optical arrangement of a see-through type display apparatus 1008 according to another example embodiment.

The see-through type display apparatus 1008 includes the display device 100, an optical coupler CB1', the polarization selection lens 400, and a concave mirror 510.

The optical waveguide 200 includes the exit surface 200a from which the light is emitted, the first surface 200b to which the light L1 of the first image is incident, the second surface 200c to which the light L2 of the second image is incident, and the third surface 200d facing the first surface 200b between the exit surface 200a and the second surface 200c. The concave mirror 510 may be adjacent to the third surface 200d of the optical waveguide 200.

The see-through type display apparatus 1008 of the example embodiment is different from the see-through type display apparatus 1006 shown in FIG. 11 in that the concave mirror 510 is arranged adjacent to the third surface 200d of the optical waveguide 200, instead of the convex lens 500 adopted in the see-through type display apparatus 1006 of FIG. 11, and an additional optical aberration is controlled through the concave mirror 510. Accordingly, the beam splitter 300 is arranged opposite to that of FIG. 11. As shown in FIG. 13, the beam splitter 300 of the optical coupler CB1' is arranged so that a surface where the polarization separation occurs faces the concave mirror 510.

Figure 14:
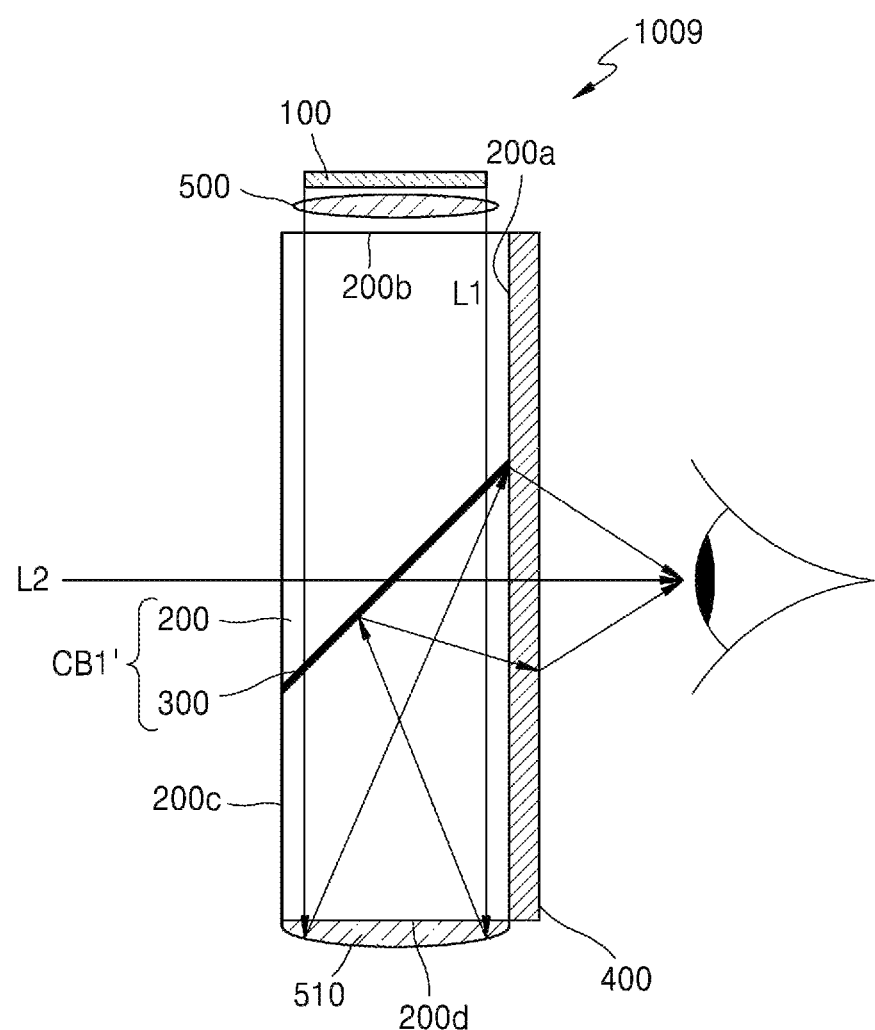
FIG. 14 is a diagram of a structure and an optical arrangement of a see-through type display apparatus according to another example embodiment.

FIG. 14 is a diagram of a structure and an optical arrangement of a see-through type display apparatus 1009 according to another example embodiment.

The see-through type display apparatus 1009 includes the display device 100, the optical coupler CB1', the polarization selection lens 400, the convex lens 500 between the display device 100 and the first surface 200b of the optical waveguide 200, and the concave mirror 510 arranged adjacent to the third surface 200d of the optical waveguide 200.

The see-through type display apparatus 1009 of the example embodiment is different from the see-through type display apparatus 1008 of FIG. 13 in that the convex lens 500 is further arranged between the display device 100 and the first surface 200b of the optical waveguide 200. Since two aberration correcting optical members are used, the optical aberration may be easily controlled and imaging optical performance may be further improved.

Figure 15:
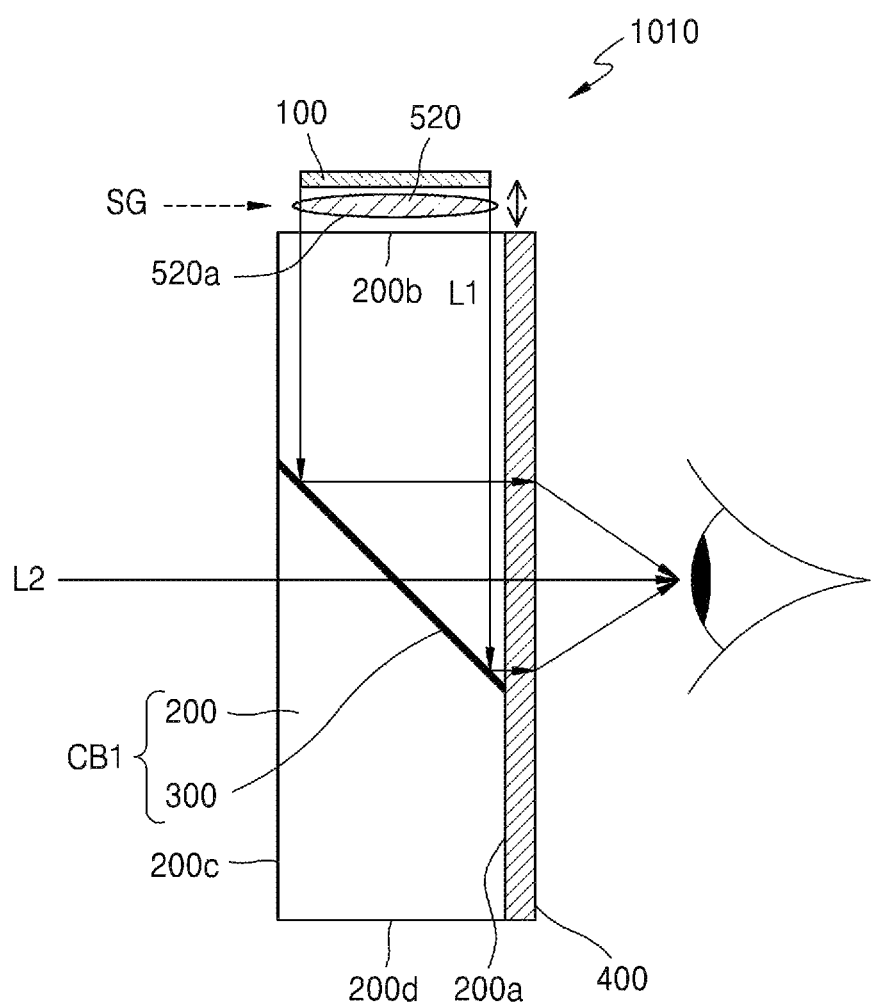
FIG. 15 is a diagram of a structure and an optical arrangement of a see-through type display apparatus according to another example embodiment.
Figure 16A:
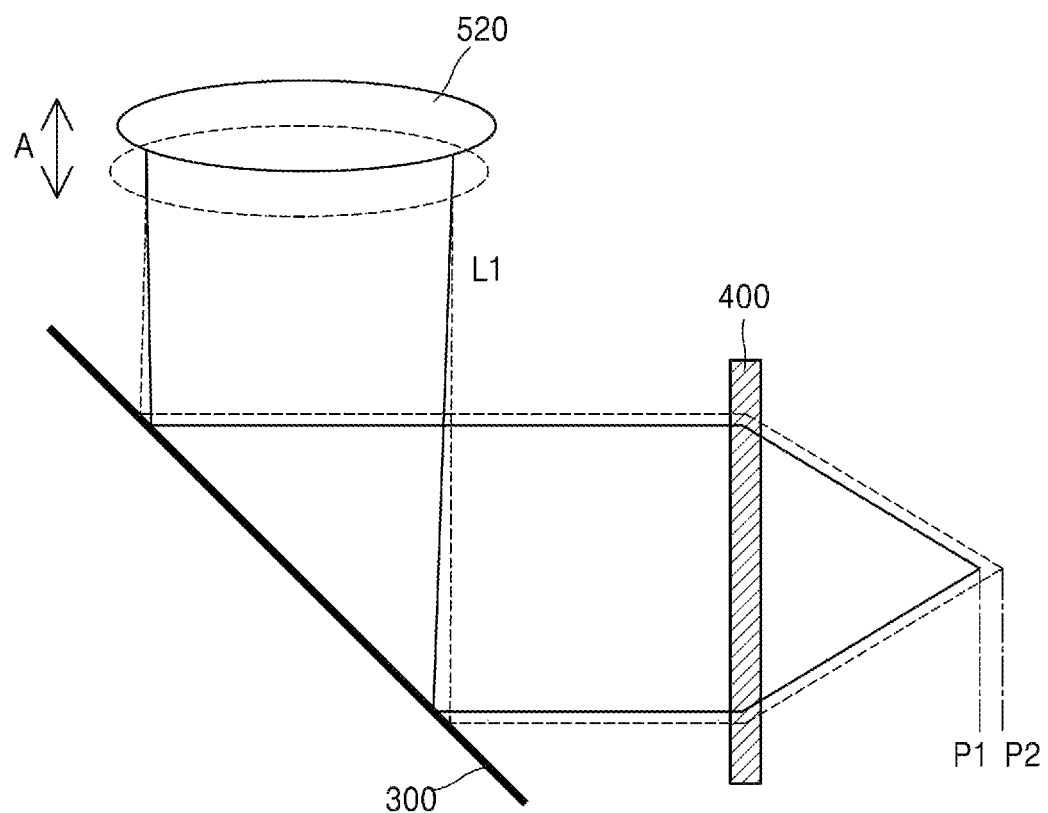
FIGS. 16A and 16B are diagrams respectively showing optical paths, on which a focusing location of incident light varies depending on operation of a lens provided in the see-through type display apparatus of FIG. 15.
Figure 16B:
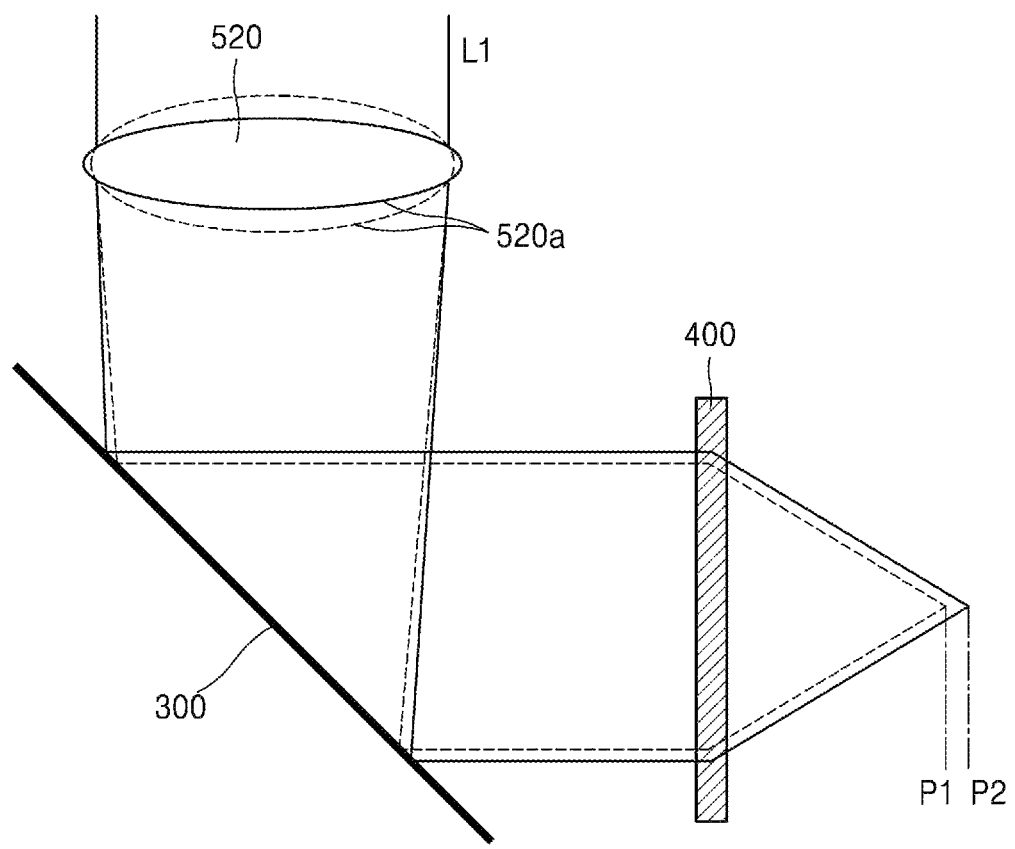

FIG. 15 is a diagram showing a structure and optical arrangement of a see-through type display apparatus 1010 according to another example embodiment, and FIGS. 16A and 16B are diagrams showing optical paths, in which a location of focusing incident light is changed according to an operation of a variable lens adopted in the see-through type display apparatus 1010 of FIG. 15.

The see-through type display apparatus 1010 includes the display device 100, the optical coupler CB1, the polarization selection lens 400, and a variable lens 520 between the display device 100 and the optical coupler CB1.

The see-through type display apparatus 1010 of the example embodiment is different from the see-through type display apparatus 1006 of FIG. 11 in that a curved surface 520a of the variable lens 520 may be adjusted or a location of the variable lens 520 on an optical axis may be adjusted according to a control signal SG from outside.

Referring to FIG. 16A, a location of the variable lens 520 on the optical axis may be moveable in a direction A. According to the location of the variable lens 520, a location of focusing the light that has passed through the beam splitter 300 and the polarization selection lens 400 may vary between P1 and P2.

Referring to FIG. 16B, a shape of the curved surface 520a in the variable lens 520 may be controlled. According to the variation in the shape of the curved surface 520a, the location of focusing the light from the variable lens 520 after passing through the beam splitter 300 and the polarization selection lens 400 may be switched to P1 or P2.

The adjusting of the focusing location may be applied to express multi-depth. The multi-depth may be expressed by varying a reference surface, on which the image from the display device 100 is focused, within a predetermined depth range, and may contribute to increase in the depth and/or reduction in visual fatigue as compared with displaying of the image at a constant depth location. Moreover, the adjustment in the focusing location may be used for correction taking into account the eyesight of an observer. A focusing location variation range for expressing the multi-depth and a focusing location variation range for correcting eyesight may be different from each other and may be appropriately set for respective purposes. Also, operation of the variable lens 520 may be controlled so that the focusing location may vary taking into account the multi-depth expression and correction of eyesight of the observer.

Figure 17:
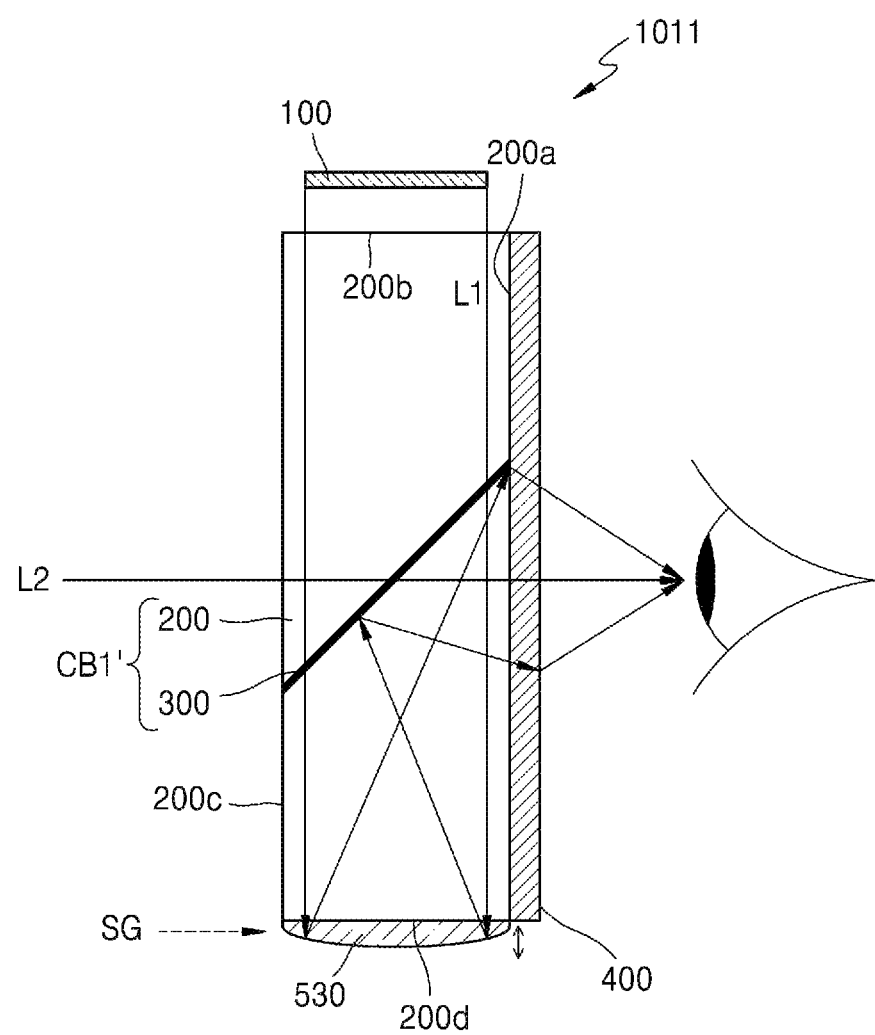
FIG. 17 is a diagram of a structure and an optical arrangement of a see-through type display apparatus according to another example embodiment.

FIG. 17 is a diagram of a structure and an optical arrangement of a see-through type display apparatus 1011 according to another example embodiment.

The see-through type display apparatus 1011 includes the display device 100, the optical coupler CB1', the polarization selection lens 400, and a variable mirror 530 arranged adjacent to the third surface 200d of the optical waveguide 200.

The see-through type display apparatus 1011 of the example embodiment is different from the see-through type display apparatus 1008 of FIG. 13 in that a curved surface of the variable mirror 530 may be adjusted or a location of the variable mirror 530 on an optical axis may be adjusted according to a control signal SG from outside.

Similarly to the see-through type display apparatus 1010 of FIG. 15, the see-through type display apparatus 1011 of the example embodiment may control the variable mirror 530 taking into account the expression of multi-depth and/or correction of eyesight of the observer.

Figure 18:
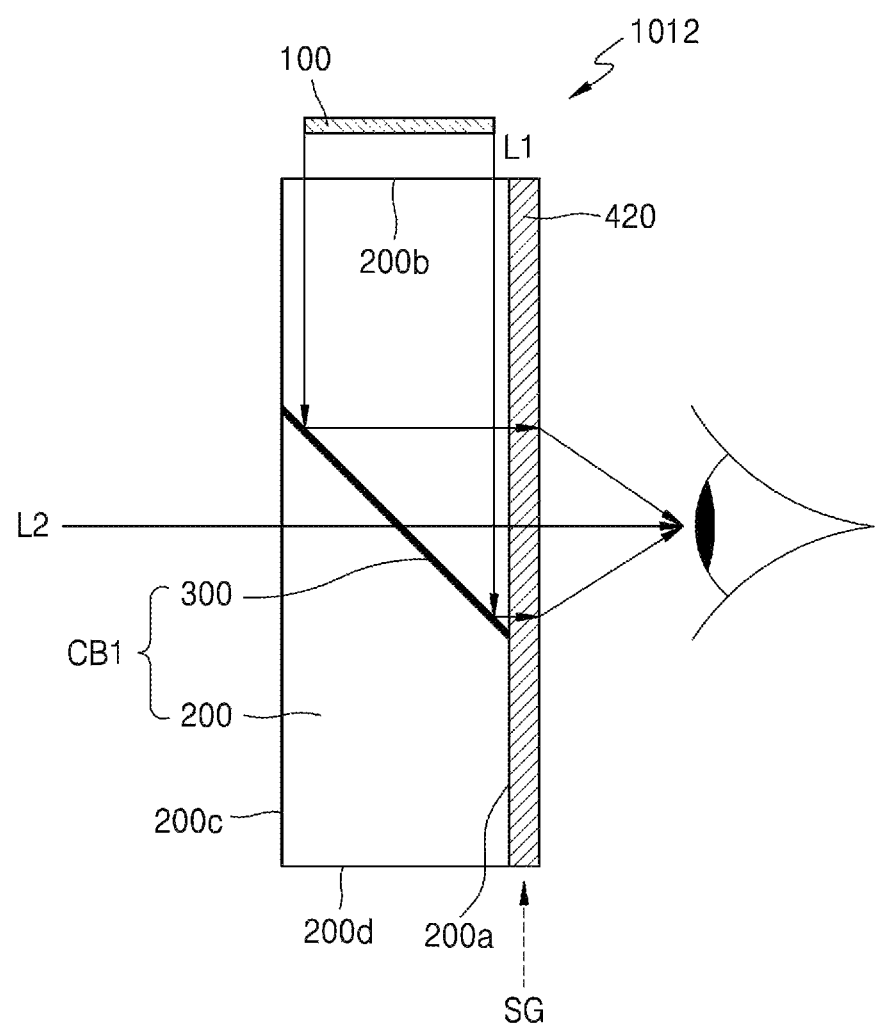
FIG. 18 is a diagram of a structure and an optical arrangement of a see-through type display apparatus according to another example embodiment.
Figure 19:
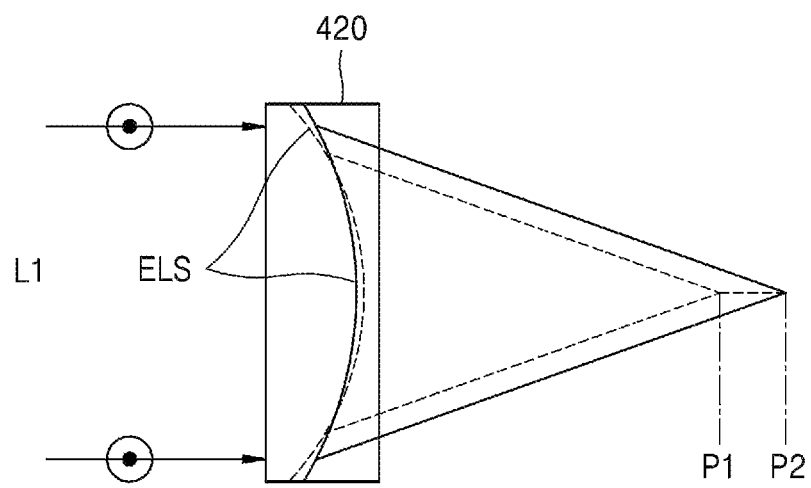
FIG. 19 is a diagram showing an optical path on which a focusing location of light of a first polarization is changed due to an operation of a polarization selection lens of FIG. 18.

FIG. 18 is a diagram showing a configuration and optical arrangement of a see-through type display apparatus 1012 according to another example embodiment, and FIG. 19 is a diagram of an optical path, on which a focusing location of light of a first polarization is changed due to operation of a polarization selection lens of FIG. 18.

The see-through type display apparatus 1012 includes a display device 100, the optical coupler CB1, and a polarization selection lens 420.

The see-through type display apparatus 1012 of the example embodiment is different from the see-through type display apparatus 1000 of FIG. 4 in that the polarization selection lens 420 is controlled according to the external signal SG and refractive power with respect to a predetermined polarization is adjusted.

Referring to FIG. 19, refractive power of the polarization selection lens 420 with respect to the light L1 of the first image in the first polarization is adjusted by an effective lens surface ELS that is variable. According to a change in the shape of the effective lens surface ELS, a focusing location of the light L1 of the first image in the first polarization ⊙ state incident on the polarization selection lens 420 is adjusted to P1 or P2.

The polarization selection lens 420 may be one of polarization selection lens PSL1, PSL2, PSL3, PSL4, or PSL5 illustrated with reference to FIGS. 3A to 3E, or a modified example thereof, and the effective lens surface ELS is conceptually shown in order to describe the refractive power varying operation. In order to transform the effective lens surface ELS, an optical anisotropic material that may be electrically controlled, e.g., a liquid crystal, may be used or a meta lens including a material, an optical property of which is changed electrically, and sub-wavelength nanostructures may be used.

Similarly to the see-through type display apparatus 1010 of FIG. 15 and the see-through type display apparatus 1011 of FIG. 17, the see-through type display apparatus 1012 of the example embodiment may control the refractive power of the polarization selection lens 420 taking into account the expression of multi-depth and/or correction of eyesight of the observer.

FIG. 19 illustrates variation in the refractive power with respect to the light L1 of the first image in the first polarization state, but the variation of the polarization selection lens 420 is not limited thereto. For example, in addition to an operation of transmitting the light of the second image in the second polarization without refracting operation to the light, the polarization selection lens 420 may be controlled to have little refractive power with respect to the light of the second image. In this case, the operation for correcting eyesight of the observer may be performed accurately, that is, the eyesight correction may be applied to a real image, as well as the image generated by the display device, and thus, a clear image may be provided to the observer.

Figure 20:
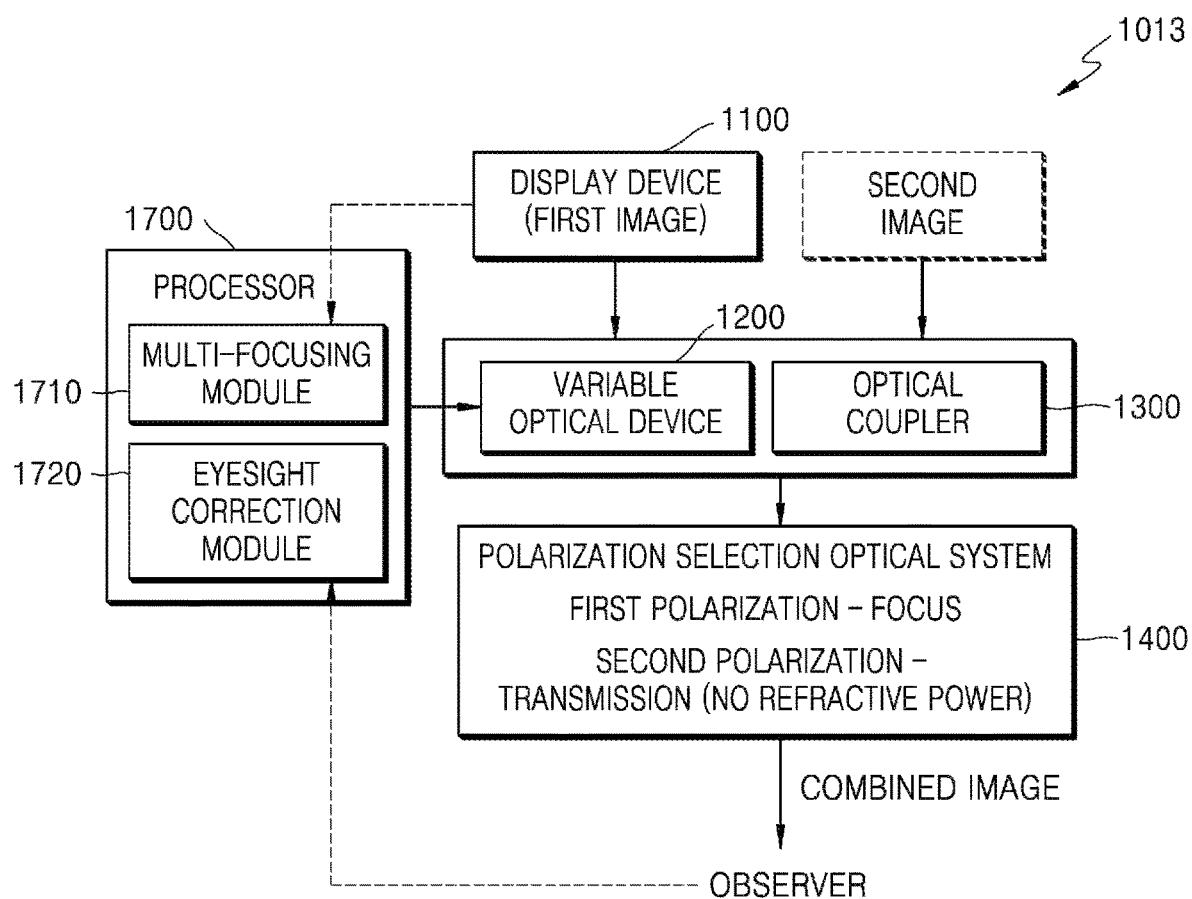
FIG. 20 is a block diagram of a see-through type display apparatus according to another example embodiment.

FIG. 20 is a block diagram of a see-through type display apparatus 1013 according to another example embodiment.

The see-through type display apparatus 1013 includes a display device 1100, an optical coupler 1300, a variable optical device 1200, a polarization selection optical system 1400, and a processor 1700.

The display device 1100 may form a first image and is substantially the same as the display device 100 illustrated in the above-described example embodiments.

The optical coupler 1300 combines a first image from the display device 1100 with a second image and outputs the first image in a first polarization and outputs the second image in a second polarization that is different from the first polarization. The second image is provided from a path different from the path of the first image that is generated by the display device 1100. For example, the second image may be a real world scene, but the second image is not limited thereto. The optical coupler 1300 may adopt the optical coupler CB1, CB2, CB3, CB4, or CB5 described above, a combination thereof, or a modified example thereof.

The variable optical device 1200 may be arranged on an optical path along which the first image proceeds towards the polarization selection optical system 1400. According to an example embodiment, the variable optical device 1200 may include the variable lens 520 (FIG. 15) or the variable mirror 530 (FIG. 17) capable of adjusting the refractive power thereof by varying a location thereof on the optical axis or varying a curved surface thereof.

The polarization selection optical system 1400 applies different refractive powers with respect to the light of the first polarization and the light of the second polarization, that is, may focus the first image in the first polarization and transmit the second image in the second polarization without refraction operation. The polarization selection optical system 1400 may adopt the polarization selection lens 400 having the different refraction operations with respect to two linear polarizations that are perpendicular to each other, or the polarization selection lens 410 having different refraction operations with respect to two circular polarizations in opposite directions and the quarter-wave plate 420.

The processor 1700 may control the variable optical device 1200. The processor 1700 may control the variable optical device 1200 for expressing multi-depth. The processor 1700 may set a range of controlling the variable optical device 1200 according to depth information of the first image, and accordingly, may control the variable optical device 1200. The processor 1700 may execute a multi-focusing module 1710 for the above control.

The processor 1700 may adjust a range of controlling the variable optical device 1200 according to eyesight information of the observer by executing an eyesight correction module 1720, and may control the variable optical device 1200 according to the range.

The processor 1700 may also control the variable optical device 1200, taking into account both the expression of multi-depth and correction of eyesight of the observer.

The see-through type display apparatus 1013 may provide the observer with a high-quality combined image that is obtained taking into account the multi-depth expression and/or the eyesight information of the observer.

Figure 21:
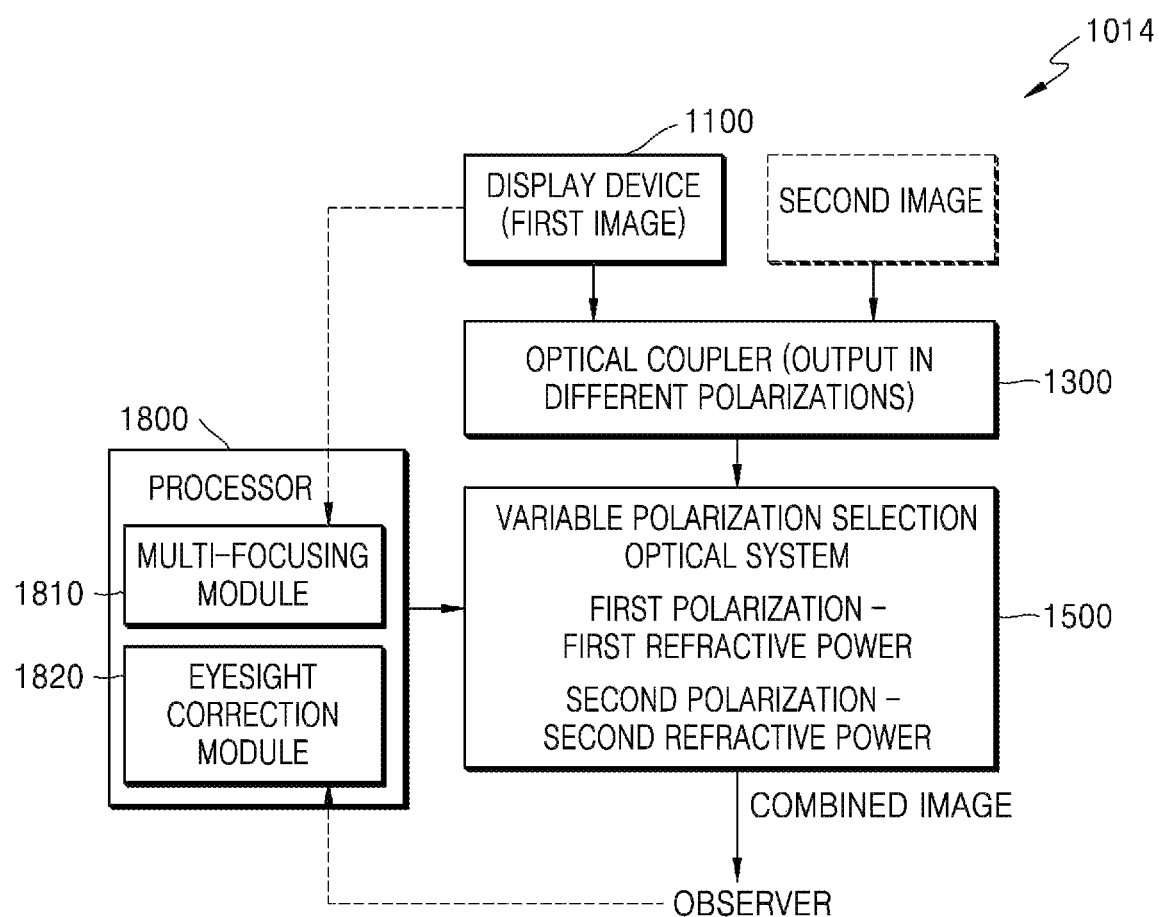
FIG. 21 is a block diagram of a see-through type display apparatus according to another example embodiment.

FIG. 21 is a block diagram of a see-through type display apparatus 1014 according to another example embodiment.

The see-through type display apparatus 1014 includes the display device 1100, the optical coupler 1300, a variable polarization selection optical system 1500, and a processor 1800.

The display device 1100 may form a first image, and is substantially the same as the display device 100 illustrated in the above-described example embodiments.

The optical coupler 1300 combines a first image from the display device 1100 with a second image from a different path from that of the first image and outputs the first image in a first polarization and the second image in a second polarization that is different from the first polarization.

The variable polarization selection optical system 1500 applies different refractive powers with respect to light of the first polarization and light of the second polarization, and the refractive power of the variable polarization selection optical system 1500 may be controlled. The variable polarization selection optical system 1500 may have first refractive power with respect to the light of the first polarization and second refractive power with respect to the light of the second polarization, and the first and second refractive powers may be adjusted according to a control signal. The variable polarization selection optical system 1500 may include the polarization selection lens 420 having the adjustable refractive power or a modified structure thereof, as described above with reference to FIG. 18.

The processor 1800 may set a range of controlling the variable polarization selection optical system 1500 according to depth information of a first image, and may control the variable polarization selection optical system 1500 according to the range. The processor 1800, that is, controls a range of controlling the first refractive power with respect to the light of the first polarization, and adjusts the first refractive power according to the range. To do this, the processor 1800 may execute a multi-focusing module 1810.

The processor 1800 may set a range of controlling the variable polarization selection optical system 1500 according to eyesight information of the observer, and may control the variable polarization selection optical system 1500 according to the range. The processor 1800, that is, controls a range of controlling the second refractive power with respect to the light of the second polarization, and adjusts the second refractive power according to the range. The processor 1800 may adjust both the first refractive power with respect to the light of the first polarization and the second refractive power with respect to the light of the second polarization, in consideration of the eyesight information of the observer. To do this, the processor 1800 may execute an eyesight correction module 1820.

The processor 1800 may also control the variable polarization selection optical system 1500, taking into account the multi-depth expression and the eyesight correction of the observer. For example, the first refractive power and/or the second refractive power may be adjusted.

The see-through type display apparatus 1014 may provide the observer with a high-quality combined image that is obtained taking into account the multi-depth expression and/or the eyesight information of the observer.

Figure 22:
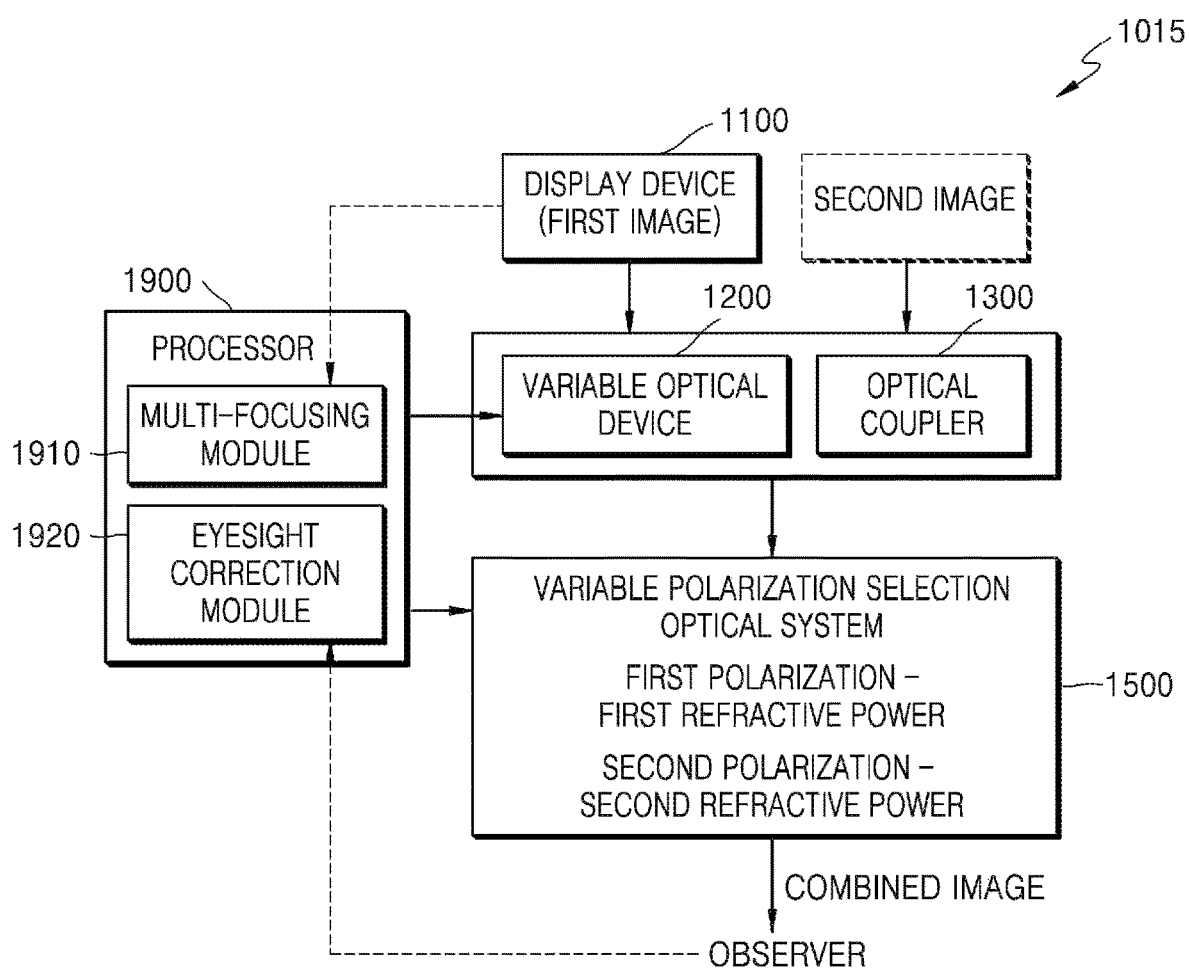
FIG. 22 is a block diagram of a see-through type display apparatus according to another example embodiment.

FIG. 22 is a block diagram of a see-through type display apparatus 1015 according to another example embodiment.

The see-through type display apparatus 1015 of the example embodiment is different from the see-through type display apparatus 1014 of FIG. 21 in that the display device 1100 and the variable optical device 1200 are further included and a processor 1900 controls the variable polarization selection optical system 1500 and the variable optical device 1200.

The variable optical device 1200 may be arranged on an optical path along which the first image proceeds towards the polarization selection optical system 1500. The variable optical device 1200 may adopt the variable lens 520 or the variable mirror 530 capable of adjusting the refractive power thereof by varying the location thereof on the optical axis or by using the variable curved surface.

The processor 1900 may set a range of controlling the variable polarization selection optical system 1500 according to depth information of a first image, and may control the variable polarization selection optical system 1500 and/or the variable optical device 1200 according to the range. That is, the processor 1900 may set, with respect to the variable polarization selection optical system 1500, the range of controlling the first refractive power with respect to the light of the first polarization, and accordingly may adjust the first refractive power according to the range. Alternatively, the processor 1900 may set a range of controlling the variable optical device 1200 and control the variable optical device 1200 according to the range. To do this, the processor 1900 may execute a multi-focusing module 1910.

The processor 1900 may set a range of controlling the variable polarization selection optical system 1500 according to the eyesight information of the observer, and may control the variable polarization selection optical system 1500 and/or the variable optical device 1200 according to the range. That is, the processor 1900 may set, with respect to the variable polarization selection optical system 1500, the range of controlling the second refractive power with respect to the light of the second polarization, and accordingly may adjust the second refractive power according to the range. Alternatively, the processor 1900 may set a range of controlling the variable optical device 1200 and control the variable optical device 1200 according to the range. The processor 1900 may adjust both the first refractive power with respect to the light of the first polarization and the second refractive power with respect to the light of the second polarization, in consideration of the eyesight information of the observer. To do this, the processor 1900 may execute an eyesight correction module 1920.

The processor 1900 may also control the variable polarization selection optical system 1500 and the variable optical device 1200, taking into account the multi-depth expression and the eyesight correction of the observer.

The see-through type display apparatus 1015 may provide the observer with a high-quality combined image that is obtained taking into account the multi-depth expression and/or the eyesight information of the observer.

The above-described see-through type display apparatus may display the image formed by the display device and the real world image to the observer, and thus, may be applied to implement augmented reality (AR).

AR may further improve the reality effect by combining the real world environment with a virtual object or virtual information. For example, additional information about the environment provided by the real world at the location of the observer may be generated by an imaging unit and provided to the observer. The AR display may be applied to a ubiquitous environment or internet of things (IoT) environment.

The real world image is not limited to the real environment, but for example, may be an image generated by another imaging apparatus. Therefore, the see-through type display apparatus may be applied as a multi-image display apparatus capable of displaying two images together.

The see-through type display apparatus may be configured as a wearable type. All or some components in the see-through type display apparatus may be configured as a wearable type.

For example, the see-through type display apparatus may be applied as a head mounted display (HMD). Also, embodiments are not limited thereto, and the 3D image display apparatus may be applied as a glasses-type display or a goggle-type display.

The see-through type display apparatus may operate in connection with other electronic devices such as a smartphone, etc. For example, a controller for driving the see-through type display apparatus may be provided in a smartphone. Moreover, the see-through type display apparatus may be included in the smartphone so that the smartphone itself may be used as the see-through type display apparatus.

The see-through type display apparatus may reduce a volume of an optical system, and may be applied as a wearable device with improved wearability.

The see-through type display apparatus may provide a combined image, and thus, may provide an AR display.

The see-through type display apparatus may provide a combined image of high image quality, which is obtained taking into account the multi-depth expression and/or eyesight of the observer.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A display apparatus comprising:
   a display device configured to output a first image;
   an optical coupler configured to:
   combine the first image received through a first path from the display device with a second image received through a second path that is different from the first path, and
   output, through an exit surface of the optical coupler, a first light corresponding to the first image in a first polarization and a second light corresponding to the second image in a second polarization;
   a polarization selection optical system arranged on the exit surface of the optical coupler and configured to have a first refractive power with respect to the first light of the first polarization and a second refractive power with respect to the second light of the second polarization; and
   an aberration correcting optical member configured to correct optical aberration corresponding to the first image, the aberration correcting optical member comprising a lens arranged between the display device and a first surface of the optical coupler, wherein a shape of a curved surface of the lens or a location of the lens on an optical axis is adjusted according to a first control signal from outside the display apparatus,
   wherein the optical coupler comprises:
   an optical waveguide comprising the first surface, a second surface, and the exit surface, wherein the first image is incident on the first surface and the second image is incident on the second surface;
   a beam splitter arranged in the optical waveguide in an inclined manner with respect to the exit surface;
   a first polarizer arranged between the display device and the optical waveguide to transform the first image into a first polarization state; and
   a second polarizer arranged on the second surface of the optical waveguide to transform the second image into a second polarization state, and
   wherein the first polarizer is arranged on the first surface of the optical waveguide.

2. The display apparatus of claim 1, wherein the first polarization and the second polarization are linear polarizations that are perpendicular to each other.

3. The display apparatus of claim 1, wherein the beam splitter comprises a polarization beam splitter that reflects the first light of the first image in the first polarization and transmits the second light of the second image in the second polarization.

4. The display apparatus of claim 3, wherein the optical waveguide further comprises a transmittance adjusting coating layer provided at least partially on the second surface and the exit surface to reduce a transmittance of light of the second image incident through the second surface and emitted from the optical coupler without passing through the polarization beam splitter.

5. The display apparatus of claim 1, wherein the beam splitter comprises a half mirror.

6. The display apparatus of claim 1, wherein the polarization selection optical system comprises a polarization selection lens configured to have refractive power with respect to light of a certain polarization and to not have refractive power with respect to light a polarization different from the certain polarization.

7. The display apparatus of claim 6, wherein the polarization selection lens has the refractive power with respect to the light of the certain polarization, the refractive power being adjustable according to a second control signal from outside the display apparatus.

8. The display apparatus of claim 6, wherein the polarization selection lens is further configured to have a positive refractive power with respect to the light of the first polarization and to not have the refractive power with respect to the light of the second polarization.

9. The display apparatus of claim 6, wherein the polarization selection lens is further configured to have a positive refractive power with respect to light of a first circular polarization and to not have refractive power with respect to light of a second circular polarization that is opposite to the first circular polarization.

10. The display apparatus of claim 9, wherein the polarization selection optical system further comprises a quarter-wave plate arranged between the exit surface and the polarization selection lens.

11. The display apparatus of claim 6, wherein an incident surface of the polarization selection lens is parallel with the exit surface of the optical coupler.

12. The display apparatus of claim 6, wherein the polarization selection lens comprises an optical anisotropic material having different refractive indices with respect to the light of the certain polarization and light of another polarization that is different from the certain polarization.

13. The display apparatus of claim 6, wherein the polarization selection lens comprises a diffraction-based lens.

14. The display apparatus of claim 6, wherein the polarization selection lens comprises:
   a half mirror;
   a reflective polarizer; and
   a quarter-wave plate arranged between the half mirror and the reflective polarizer.

15. The display apparatus of claim 1, being a wearable see-through type display device.

16. A display apparatus comprising:
   a display device configured to output a first image;
   an optical coupler configured to:
   combine the first image received through a first path from the display device with a second image received through a second path that is different from the first path, and
   output, through an exit surface of the optical coupler, a first light corresponding to the first image in a first polarization and a second light corresponding to the second image in a second polarization;

a polarization selection optical system arranged on the exit surface of the optical coupler and configured to have a first refractive power with respect to the first light of the first polarization and a second refractive power with respect to the second light of the second polarization; and an aberration correcting optical member configured to correct optical aberration corresponding to the first image, wherein the optical coupler comprises:
an optical waveguide comprising a first surface, a second surface, and the exit surface, wherein the first image is incident on the first surface and the second image is incident on the second surface;
a beam splitter arranged in the optical waveguide in an inclined manner with respect to the exit surface;
a first polarizer arranged between the display device and the optical waveguide to transform the first image into a first polarization state; and
a second polarizer arranged on the second surface of the optical waveguide to transform the second image into a second polarization state, wherein the first polarizer is arranged on the first surface of the optical waveguide, wherein the optical waveguide further comprises a third surface between the second surface and the exit surface, the third surface being away from the first surface, and the aberration correcting optical member is a mirror arranged on the third surface, and wherein a shape of a curved surface in the mirror or a location of the mirror on an optical axis is adjusted according to a control signal from outside the display apparatus.

17. A display apparatus comprising:
a display device configured to output a first image;
an optical coupler configured to:
combine the first image received through a first path from the display device with a second image received through a second path that is different from the first path, and output, through an exit surface of the optical coupler, a first light corresponding to the first image in a first polarization and a second light corresponding to the second image in a second polarization; and a polarization selection optical system arranged on the exit surface of the optical coupler and configured to have a first refractive power with respect to the first light of the first polarization and a second refractive power with respect to the second light of the second polarization, wherein the optical coupler comprises:
an optical waveguide comprising a first surface, a second surface, and the exit surface, wherein the first image is incident on the first surface and the second image is incident on the second surface;
a beam splitter arranged in the optical waveguide in an inclined manner with respect to the exit surface, the beam splitter being a polarization beam splitter that reflects the first light of the first image in the first polarization and transmits the second light of the second image in the second polarization; and
a transmittance adjusting coating layer provided at least partially on each of the second surface and the exit surface to reduce a transmittance of light of the second image incident through the second surface and emitted from the optical coupler without passing through the polarization beam splitter.

18. The display apparatus of claim 17, wherein the transmittance adjusting coating layer is provided only partially on each of the second surface and the exit surface.

* * * * *